(12) United States Patent
Beri

(10) Patent No.: US 11,027,436 B2
(45) Date of Patent: Jun. 8, 2021

(54) SOFT ROBOTIC ASSISTIVE GRIPPING DEVICE

(71) Applicant: Alekh Rajesh Beri, Westford, MA (US)

(72) Inventor: Alekh Rajesh Beri, Westford, MA (US)

(*) Notice: Subject to any disclaimer, the term of this patent is extended or adjusted under 35 U.S.C. 154(b) by 307 days.

(21) Appl. No.: 15/958,744

(22) Filed: Apr. 20, 2018

(65) Prior Publication Data
US 2018/0361596 A1 Dec. 20, 2018

Related U.S. Application Data

(60) Provisional application No. 62/521,880, filed on Jun. 19, 2017.

(51) Int. Cl.
*B25J 15/00* (2006.01)
*B25J 15/12* (2006.01)
(Continued)

(52) U.S. Cl.
CPC ............ *B25J 15/0009* (2013.01); *A61H 1/02* (2013.01); *B25J 13/08* (2013.01); *B25J 13/084* (2013.01);
(Continued)

(58) Field of Classification Search
CPC .... A61H 1/02; A61H 1/0285; A61H 2201/16; A61H 2201/1635; A61H 2201/5023;
(Continued)

(56) References Cited

U.S. PATENT DOCUMENTS 9,464,642 B2 10/2016 Ilievski et al.
2007/0072739 A1* 3/2007 Kaufman ............ A61H 1/0285
482/44
(Continued)

OTHER PUBLICATIONS

Cetinus et al., "Hand grip strength in patients with type 2 diabetes mellitus", May 4, 2005, pp. 278-285 (Year: 2005).*
(Continued)

*Primary Examiner* — Tu A Vo
*Assistant Examiner* — Alexander Morales
(74) *Attorney, Agent, or Firm* — Clark & Elbing LLP

(57) ABSTRACT

This invention is directed to offer a customizable, cost effective, and comfortable soft gripping solution for patients with chronic disabilities, such as diabetic neuropathy, allowing the patients to function independently and perform routine daily tasks. A soft robotic gripper has been developed with one or more inflatable systems actuated by aft to assist a user to grip an object. The main body of the gripper bends with air actuation while the fingertip actuation helps functionality in the extremities. The gripper is further enhanced by adding sensors that integrate feedback for sensitivity to touch, conformability, and grip ability. The modular design modifications allow for gripper adjustments as the disease progresses or rescinds. The gripper also works as a training aid for routine physical therapy exercises. Data collected by a microprocessor can also help learn more about these chronic diseases and use artificial intelligence to customize treatment regimens for individual patients.

24 Claims, 30 Drawing Sheets

(51) Int. Cl.
  *B25J 13/08* (2006.01)
  *B25J 9/14* (2006.01)
  *A61H 1/02* (2006.01)

(52) U.S. Cl.
  CPC .......... *B25J 15/0023* (2013.01); *B25J 15/12* (2013.01); *A61H 1/0285* (2013.01); *A61H 2201/0103* (2013.01); *A61H 2201/0153* (2013.01); *A61H 2201/1238* (2013.01); *A61H 2201/165* (2013.01); *A61H 2201/1635* (2013.01); *A61H 2201/1638* (2013.01); *A61H 2201/5058* (2013.01); *A61H 2201/5071* (2013.01); *A61H 2201/5082* (2013.01); *B25J 9/142* (2013.01)

(58) Field of Classification Search
  CPC ...... A61H 2201/503; A61H 2201/5058; A61H 2201/5071; A61H 2201/5083; A61H 2205/065; B25J 9/142; B25J 9/06; B25J 9/0006; B25J 9/0015; B25J 9/0084; B25J 9/1612; B25J 13/08; B25J 13/084; B25J 13/02; B25J 13/025; B25J 13/082; B25J 15/0009; B25J 15/0023; B25J 15/12; B25J 15/0019
  See application file for complete search history.

(56) References Cited

U.S. PATENT DOCUMENTS

| | | | | |
|---|---|---|---|---|
| 2012/0029399 | A1* | 2/2012 | Sankai | A61B 5/6812 601/40 |
| 2016/0252110 | A1* | 9/2016 | Galloway | A61B 34/70 60/327 |
| 2017/0144312 | A1* | 5/2017 | Hamdi | A61B 5/1121 |
| 2017/0168565 | A1* | 6/2017 | Cohen | A61B 5/0022 |
| 2018/0296419 | A1* | 10/2018 | Tong | B25J 9/142 |
| 2018/0303698 | A1* | 10/2018 | Wijesundara | F15B 15/08 |

OTHER PUBLICATIONS

Finio et al., "Air-Powered Soft Robots for K-12 Classrooms," Third IEEE Integ. STEM Ed. Conf. 1- 6 (2013).

Polygerinos et al., "Soft Robotic Glove for Hand Rehabilitation and Task Specific Training," IEEE 1-7 (2015).

Shull et al., "Haptic wearable as sensory replacement, sensory augmentation and trainer—a review," J. Neoroeng Rehabil. 12(59):13 (2015).

Hughes et al., "Soft Manipulators and Grippers: A Review," Front. In Rob. 3:12 (2016).

Delph et al., "A soft robotic exomusculature glove with intergrated sEMG sensing for hand rehabilitation," IEEE Int Conf Rehabil Robot. (2013) (8 pages).

Goldfield et al., "Bio-Inspired Design of Soft Robotic Assistive Devices: the Interface of Physics, Biology, and Behavior," Ecol Psych. 24(4):300-327 (2012).

National Institute of Neurological Disorders and Stroke. National Institute of Health, www.ninds.nih.gov/Disorders/Patient-Caregiver-Education/Fact-Sheets/Peripheral-Neuropathy-Fact-Sheet. Accessed 2 Jan. 2017.

"Nerve Damage (Diabetic Neuropathies)." National Institute of Diabetes and Digestive and Kidney Diseases, National Institute of Health, www.niddk.nih.gov/health-information/diabetes/overview/preventing-problems/nerve-damage-diabetic-neuropathies. Accessed Jan. 2, 2017.

Deimel et al., "A Novel Type of Compliant, Underactuated Robotic Hand for Dexterous Grasping," Robotics Proceedings. (2015).

Rus et al., "Design, fabrication and control of soft robots," Nature. 521(7553):467-75 (2015).

Bilodeau et al. "Monolithic Fabrication of Sensors and Actuators in a Soft Robotic Gripper," 2015 IEEE/RSJ International Conference on Intelligent Robots and Systems (IROS). 2324-2329 (2015).

Elsayed et al., "Finite Element Analysis and Design Optimization of a Pneumatically Actuating Silicone Module for Robotic Surgery Applications," Soft Robotics. 2(00):1-8 (2014).

Mosadegh et al., "Pneumatic Networks for Soft Robotics that Actuate Rapidly." Advanced Functional Materials. 24(15): 2163-2170 (2014).

"SIK Experiment Guide for Arduino." Sparkfun. N.p.,n. d. Web. Jun. 29, 2016.

"2016 Soft Robotics Competition." Soft Robotics Toolkit. Harvard University, n. d. Web. Jun. 30, 2016.

Finio et al., "Squishy Robots: Build an Air-Powered Soft Robotic Gripper." Science Buddies. N. p., n. d. Web. Jun. 29, 2016.

She et al., "Design and Fabrication of a Soft Robotic Hand With Embedded, Actuators and Sensors," Journal of Mechanisms and Robotics. (2015).

Polygerinos, Panagiotis, et al. "Towards a Soft Pneumatic Glove for Hand Rehabilitation." 2013 IEEE/RSJ International Conference on Intelligent Robots and Systems (IROS). Originally published in 2013 IEEE/RSJ International Conference on Intelligent Robots and Systems (IROS).

Polygerinos et al., "Soft robotic glove for combined assistance and at-home rehabilitation," Robotics and Autonomous Systems. 73:135-143 (2015).

* cited by examiner

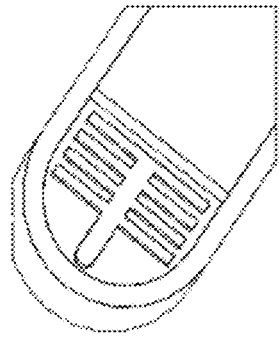
FIG. 2C
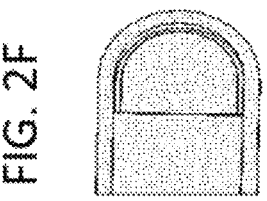
FIG. 2D
FIG. 2E
FIG. 2F
FIG. 2G
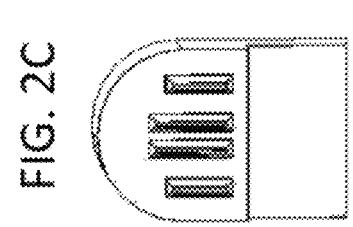
FIG. 2H
FIG. 2I
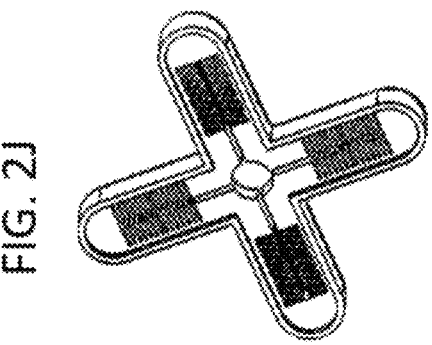
FIG. 2J
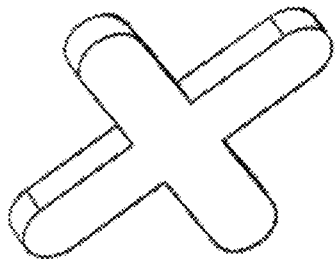
FIG. 2K Bending Motion
Four Center faces restrained Twisting Motion
Two Center faces restrained Linear Motion
One Center face restrained

FIG. 21A

| Flex angle, degrees | Temp, °C | Grip Force, psi | Grip Function |
|---|---|---|---|
| 60 | 32 | 15 | Y |
| 80 | 32 | 20 | Y |
| 60 | 38 | 15 | Y |
| 80 | 38 | 20 | Y |
| 30 | 50 | 5 | N |
| 80 | 50 | 15 | N |
| 120 | 50 | 30 | N |
| 20 | 20 | 5 | N |
| 70 | 20 | 5 | N |

SOFT ROBOTIC ASSISTIVE GRIPPING DEVICE

BACKGROUND OF THE INVENTION

Peripheral neuropathy affects 20 million people in the US alone (National Institute of Neurological Disorders and Stroke). The most common form of peripheral neuropathy is diabetic neuropathy, in which nerve damage occurs due to high sugar levels. In 2015, it was estimated that there were 415 million people worldwide with diabetes. By 2040, the number is estimated to rise to 642 million (International Diabetes Federation). More than 50% of diabetics have some form of neuropathy. Diabetes is a progressive disease and nerve damage and loss of nerve cells happens in ascending order. Neuropathy causes patients to have severely decreased feeling, increased pain, needles, numbness, lack of coordination, loss of sensitivity, and loss of functionality of their hands. People with neuropathy have reduced temperature and pain sensitivity due to numbness and can potentially burn, wound, or seriously injure themselves without even knowing it. Since wound healing is slow in diabetes, it can result in serious complications and amputations if proper care and caution are not followed.

For neuropathy, a typical treatment plan involves three steps: pain reduction, increase of functionality, and avoiding complications. Most of the medical focus is on nerve pain reduction for the patients. Currently, few solutions exist for patients suffering from peripheral neuropathy that aid in effective performance of daily routine tasks and avoiding injuries, illustrating a significant unmet need. For people with a diabetic neuropathy, the hand functions more as a flat hand rather than a normal hand with full grip functionality and lacks sensation in the finger tips and extremities. This can be very frustrating as peripheral neuropathy patients try to perform daily chores, such as adjust water temperature if it is too hot or too cold, grip small objects, or turn door knobs.

There exists a need for devices that can assist peripheral neuropathy patients to perform daily tasks.

SUMMARY OF THE INVENTION

Described herein is an assistive gripping device that functions like a human hand by assisting a user to touch, sense, and grip objects. The device consists of a soft gripper made with flexible materials (e.g., silicone rubber) and powered by compressed aft. The gripper is further functionally enhanced with sensors for detecting a physical stimulus (e.g., temperature, pressure, flexure, and motion). The sensors add end use function feedback of sensitivity, conformability and grip ability. The signal processing and control is handled via a microprocessor. The device provides both gross and fine motor controls as needed.

The soft gripper exhibits a modular design configured to be adjustable and modified with interchangeable components. The soft gripper comprises of at least one aft powered system, a molded body that provides the macro actuating bending motion and a skin that overlays the body that provides the micro actuating bending motion in the fingertip areas. This represents the function of the hand joints and further enhances control in the extremities. The skin and the body can be integrated into a single layer or piece, such that the two cannot be separated. Alternatively, the skin can be configured as a "cover" that is designed to be easily applied to and removed from the body, such that the functionality of the gripper can be easily modified based on the skin that is applied to the body, Some versions may use pressure sensitive adhesives for semi-permanent attachments.

As an example, two part silicone materials can be poured and cured into a 3D-printed mold, which creates the body of gripper with small aft tubes providing structure for aft flow (channels 1-2 mm in length). For the skin cover, another layer is poured into a separate mold made of Aluminum tray or Silicone mold with surface features. The body and skin are then joined with a thin layer of Silicone two-part material as a glue layer. Once it cures, the skin encloses the aft channels that, when inflated with an aft source, cause actuation of the gripper. The skin layer may be about 2 mm (e.g., 0.5 mm, 1 mm, 1.5 mm, 2 mm, and 2.5 mm) thick and have various combinations of modular design enhancements for improving finger grip such as raised structure, ribs, knurl texture and has micro channels (e.g., 100µ-500 µm) for fine grip control. These micro channels can also be pressurized by aft to optimize local grip control in extremities. Using sensors, the effectiveness of the gripper is measured in the aspects of pressure, temperature, and flexibility for end use application.

A series of experiments and potential applications of this gripper are described herein. The silicone rubber gripper actuated by air under five psi can be used to safely grasp and pick up various objects (e.g., door knob, silverware, drawer handle). The functionality of the gripper can be further enhanced with design features, restraints to promote air flow to a desired area of the gripper, material selection, and pressure settings. The finger area micro channels can be actuated with very little aft. The soft gripper configuration coupled with sensors provides an affordable and customizable assistive solution for patients with chronic disabilities, such as diabetic neuropathy, and patients who have lost the sense of touch, thereby allowing the patient to function independently.

In a first aspect, this invention features a gripping device comprising a plurality of arms (e.g., 2, 3, 4, 5, 6, 7, 8, 9, and 10) that are actuated by a fluid (e.g., air). The arms are fabricated from a molded body comprising a series of interconnected chambers. The molded body is made from a soft Silicone material in the durometer range of Shore 00-30 to Shore 30A, while the skin be made of equal or slightly higher durometer silicone materials in the durometer range of Shore 00-30 to Shore 50A. The molded body has at least one pressurizing inlet that is pneumatically coupled to the series of interconnected chambers. The pressurizing inlet can receive air to fill the chambers and actuate the molded body by expanding the elastic material, thus causing a bending motion around the strain limiting portion of the molded body. Within the molded body, center restraints can be added to tailor and control the bending motion in a certain way. The skin when affixed to the molded body can function as the strain limiting layer for the macro bending motion. Micro channels in the skin can also be inflated for enhancing grip in fingertip area. Furthermore, at least one sensor is attached or integrated into the gripping device to detect a sensory stimulus (e.g., temperature, pressure, flexure, and motion). The sensors used are may be more cost effective, off the shelf accessible, and flexible, such that they can be mounted on the soft gripper. The sensor components can be mounted on a skin layer that is re-useable and can be changed over the gripper. In another variation, the sensor may be potted in the finger area skin in the modular gripper.

The gripping device may further comprise a microprocessor or a peripheral device (e.g., feedback device, cellphone, tablet, and LED display) that displays information and data collected by the sensors. The microprocessor may be programmed with artificial intelligence software. The sensor data can be stored on a data storage device, such as a hard drive, or transmitted to a cloud. The gripping device may include a modular component affixed to the actuatable arm. In some embodiments of the device, the tip of the actuatable arm is shaped like a fingertip. The tip of the actuatable arm or the fingertip may be textured (e.g., with ribs or protrusions) and may contain micro air channels that have a second pressurizing inlet. The micro channels may actuate the tip of the actuatable arm. In some embodiments of the device, the gripping device is integrated into a glove or configured to be affixed to a hand (e.g., with a strap). In any of the above embodiments, the gripping device may also comprise accentuated fingers, and it may also be configured to replace a function (e.g., sense, touch, grip) of the hand.

In another aspect, the invention features a method of gripping an object by initiating a series of pressurizations and depressurizations that bring the gripping device in contact with a target object. The method may include using the gripping device as an assistive device for a user (e.g., a human) suffering from a peripheral dysfunction caused, for example, by a disease or injury (e.g., peripheral neuropathy, diabetic neuropathy, and injury to limb or extremity). The gripping device may be affixed to the hand of a user or affixed to an extended rod, where the rod is affixed to the user. The user may input specific sensory parameters (e.g., temperature, pressure, and flexure) on the peripheral device to define a normal range of operation (e.g., 15-37° C., 1-25 psi, and 0-180°, respectively). When the sensor detects the sensory parameter or stimulus is outside the predefined range, it can alert the user or a third party responder.

The gripping device may be used as a training device for a user such that the gripping device assists the user with a rehabilitation exercise by providing an assistive gripping force. The gripping device can be modulated over time to tailor for personal preference or to respond to degeneration or improvement of peripheral limb functionality. In some embodiments of this aspect, the gripping device can be replaced with a second gripping device with increased or decreased assistive gripping force. In other embodiments of this aspect, the gripping device can be modularly altered (e.g., with a sensor or grip enhancers, such as a rubber component) such as to provide increased or decreased gripping force.

The gripping device can also be used to monitor the progression of a disease (e.g., diabetic neuropathy, diabetes, and Parkinson's disease) by monitoring the increase or decrease of gripping strength or sensitivity over time. The gripping device can be used to monitor the progress of a peripheral neuropathy by assessing the gripping strength or sensitivity to temperature, pressure, or flexure of a patient's hand. If the gripping strength or sensitivity to temperature, pressure, or flexure of the gripping device needs to be increased, then the peripheral neuropathy has worsened. Alternatively, if the gripping strength or sensitivity to temperature, pressure, or flexure of the gripping device needs to be decreased, then the peripheral neuropathy has improved.

BRIEF DESCRIPTION OF THE DRAWINGS

FIGS. 2C-2P are schematic drawings and photographs of a mold for skin finger area enhancement showing designs with raised contours, ribs, and textures.
FIGS. 2C-2D show ribbed finger grips.
FIGS. 2E-2F show a protruded finger groove.
FIG. 2G shows micro channels in the fingertip.
FIGS. 2H-2I show skin molds for four arm grippers with enhanced fingertip designs.
FIGS. 2J-2K show body molds for four arm grippers with enhanced fingertip designs.
FIG. 2P is a schematic drawing of modular PDMS components that can be added to the finger area.
FIG. 3F is a photograph of a flexible silicone rubber body that bends when inflated with air. It can be optimized with a center restraint material selection so that air flows to the arms.
FIG. 3G is a photograph of the strain-limiting skin that is glued on the rubber body. The skin can be optimized with different material grades and pressure source.
FIG. 3H is a schematic drawing of fingertip grip options such as protrusions and ribs. The skin can also be made with micro channels that can be inflated separately or with the same source to add further bending at a joint.

FIG. 21A is a decision tree with continuous values showing how grip function can be triggered at certain flex angles (°), temperatures (° C.), and grip forces (psi). Flex sensor angles may range from 0° (at rest) to 180° (max bend). Grip force may be measured by air pressure required to bend the device to grip and object.

DETAILED DESCRIPTION

Figure 1A:
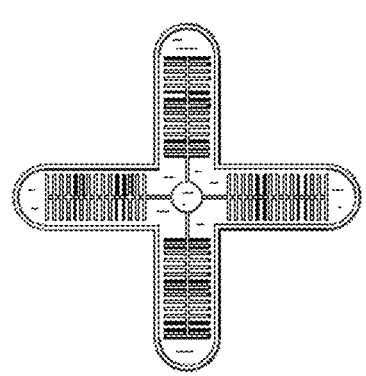
FIG. 1A is a photograph of a 3D printed mold for a four arm gripper.
Figure 1B:
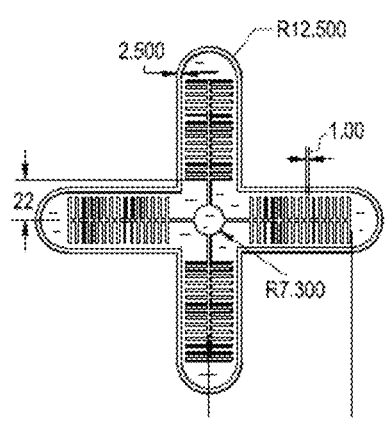
FIG. 1B is a schematic drawing of a mold for a four arm gripper molded body.
Figure 1C:
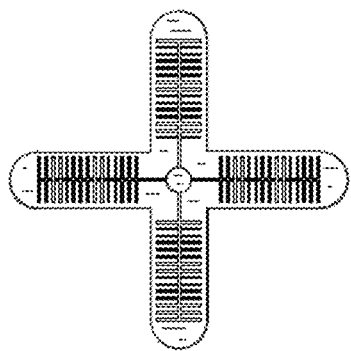
FIG. 1C is a photograph of the molded body after being removed from the mold after curing.
Figure 1D:
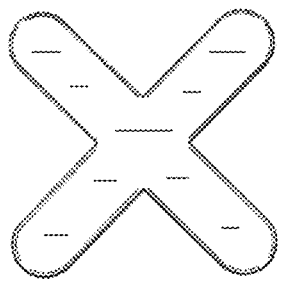
FIG. 1D is a photograph of the strain-limiting skin layer that is attached to the body.
Figure 1F:
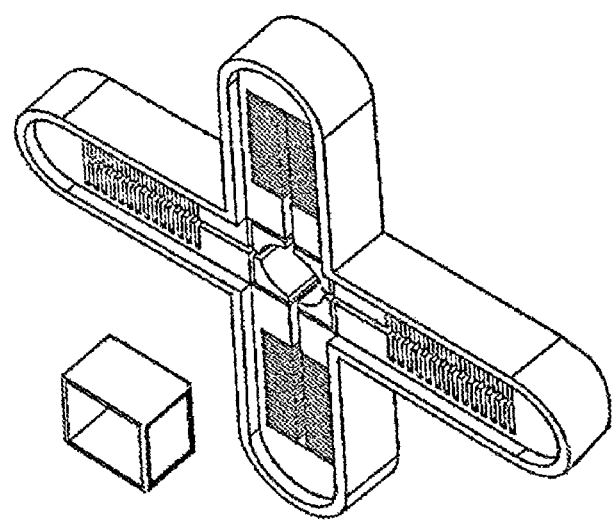
FIG. 1F is a schematic drawing of a molded body showing interchangeable center restraints.
Figure 1E:
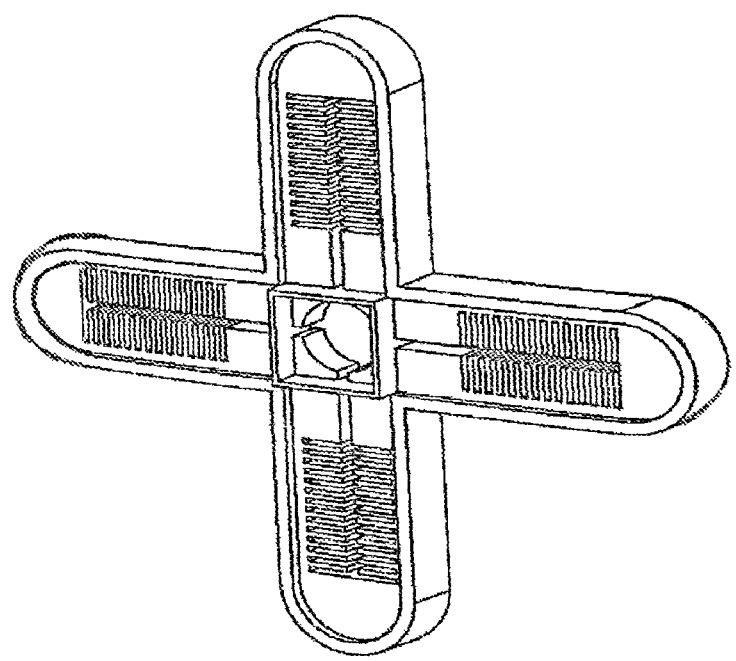
FIG. 1E is a schematic drawings of a molded body with a center restraint.

Using soft materials and robotics, an adjustable and cost effective gripping solution can been created that offers biosimilar functionality and has been advanced into end use solution for neuropathy patients with temperature, over-straining, gripping and sensitivity detection and solution in extremities. Furthermore the gripper can be used as training and monitoring device for diabetic neuropathy. As the disease progresses, using artificial intelligence and deep learning, combined with sensor monitoring and an adjustable robotic gripper, the device can be used as a non-invasive learning tool. This concept can be evolved into developing artificial organ design, behavior and learning.

Described herein is a gripping device comprising a plurality of arms (e.g., 2, 3, 4, 5, 6, 7, 8, 9, and 10) that are actuated by a fluid or gas. The arms are fabricated from a molded body comprising a series of interconnected chambers for macro bending control. The molded body can be made from a soft rubber material and then bonded to a skin material that is of similar stiffness or slightly stiffer and forms the base. The skin has grip features in the perimeter finger area and has micro channels that can also be inflated as needed for micro grip control. The molded body has at least one pressurizing inlet that is fluidly coupled to the series of interconnected chambers. The pressurizing inlet(s) can receive fluid or gas to fill the chambers and actuate the molded body by expanding the soft rubber elastic material, thus causing a bending motion around the base of the molded body. Furthermore, at least one sensor is attached or integrated on the gripping surface of the gripping device to detect a sensory stimulus. The device may be used as an assistive device or a rehabilitation device for a user suffering from a peripheral dysfunction (e.g., injury and neuropathy). The device may also be used to track disease progression of a user suffering from a disease (e.g., a peripheral dysfunction), such as by monitoring the gripping ability or sensation of a user over time.

The gripping device can be used as a solution to ease day to day chores for patients suffering from a neuropathy (e.g., diabetic neuropathy). This will aid in avoiding accidents (e.g., burns and broken finger(s)) that can result in serious complications, such as an amputation or infection. For example, a temperature sensor can be used to prevent a user from touching a hot stove that can severely burn the user or to minimize the amount of contact with a hot surface.

The gripping device can be fabricated with cost effectiveness in mind, allowing for enhanced customizability across a wide range of users. For progressive diseases, such as a diabetic neuropathy, the gripper can be adjusted for size, fit, and physical parameters (e.g., level of assistive grip force and flexibility), and optimized as the disease progresses. Training exercises with the gripper can also help prevent further nerve damage and improve neuropathy for some patients. The gripper can also be used as a training device to rehabilitate an injury (e.g., broken finger, broken hand, and torn ligament or tendon in a hand) by enhancing peripheral movement of the extremities to a normal range of motion and strength.

Gripping Device

Figure 2B:
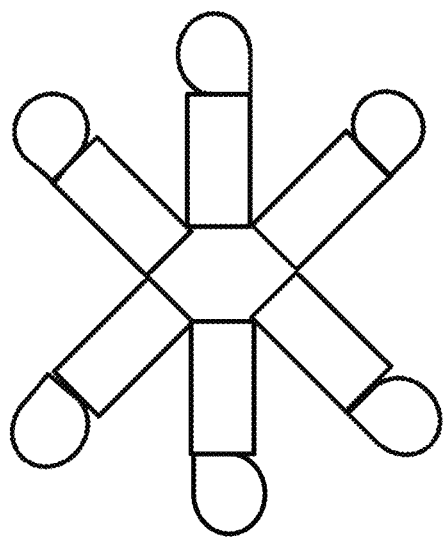
FIG. 2B is two schematic drawings of a claw shaped gripper.
Figure 2A:
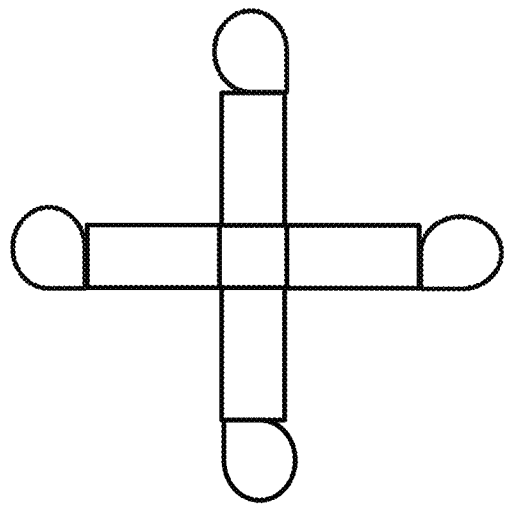
FIG. 2A is a schematic drawing of a four arm gripper with accentuated fingertips to provide enhanced grip.
Figure 2M:
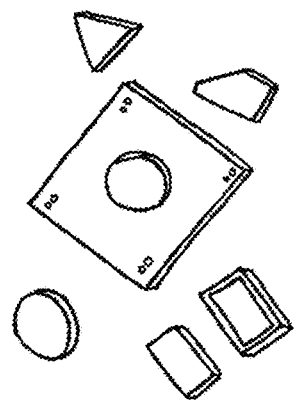
FIG. 2M is a photograph (left panel) and schematic drawing (right panel) showing modular components that may be added on to the finger area such as gaskets, sponges, seals, or cushions.
Figure 2P:
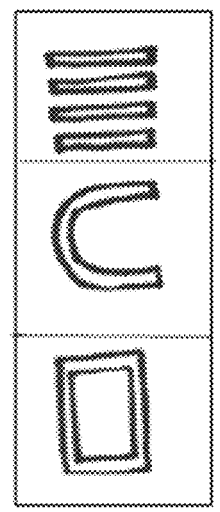
Figure 2O:
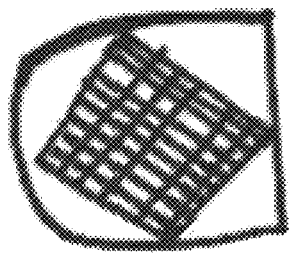
FIG. 2O is a schematic drawing of a mold surface that can be used for added texture.
Figure 2L:
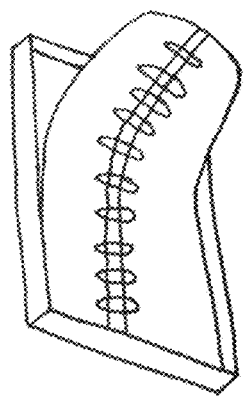
FIG. 2L are two schematic drawings showing how PDMS can be potted with micro channels using stereo lithography, 3D printing, or inkjet printing.
Figure 2N:
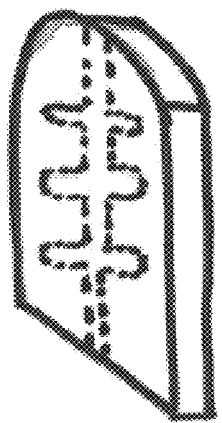
FIG. 2N is a schematic drawing of a fingertip that can be potted with micro channels using stereo lithography, 3D printing, or inkjet printing.
Figure 3A:
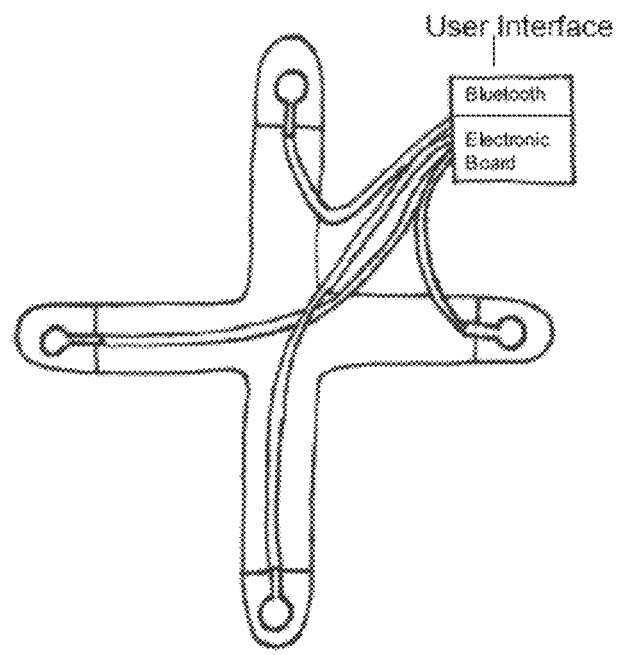
FIG. 3A is a schematic drawing of the gripping device with sensors connected to a user interface and electronics board. The sensors can be wired to the microprocessor or connected wirelessly. The microprocessor may also contain artificial intelligence software
Figure 3B:
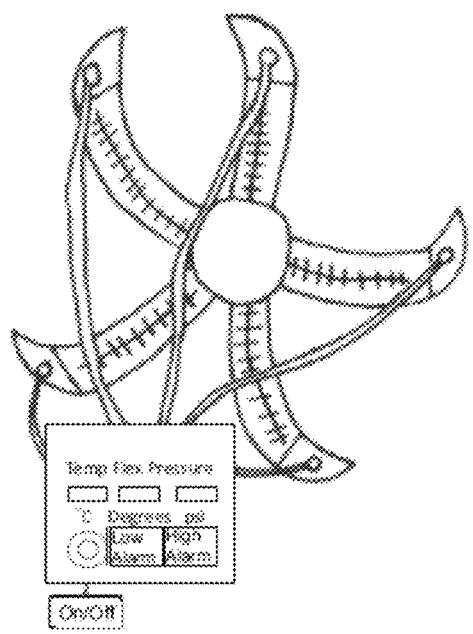
FIG. 3B is a schematic drawing of the gripping device connected to a peripheral device showing temperature, flexure, and pressure parameters measured by the sensors.
Figure 3C:
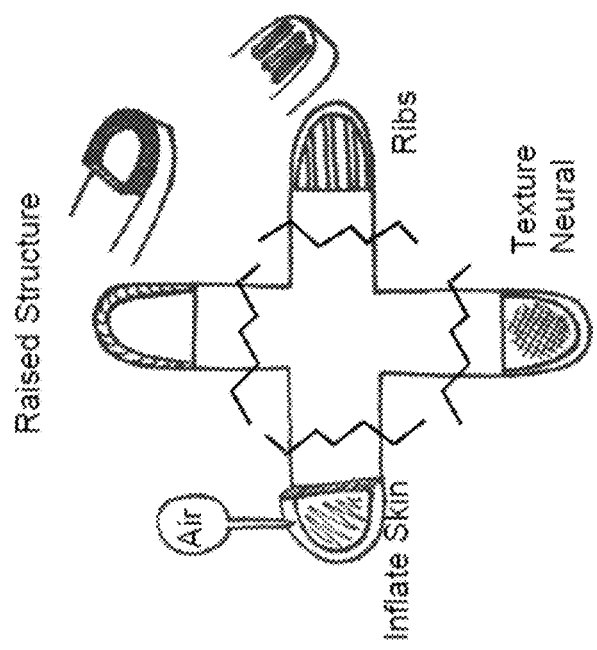
FIG. 3C is a schematic drawing of the gripping device with enhanced fingertip design elements. Any given fingertip may contain a protrusion, inflatable skin, ribs, and/or textured materials. The squiggly lines represent breaks indicating that not all four elements are required on a single gripper.
Figure 3D:
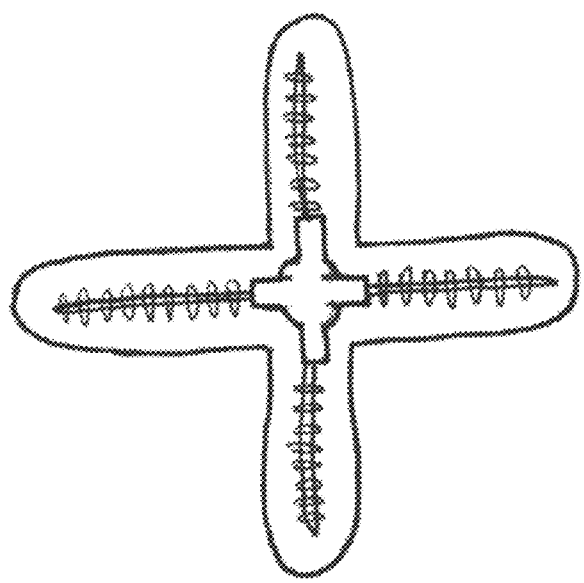
FIG. 3D is a schematic drawing of mold of a four arm center restraint design which accommodates better air flow to the tips of the fingertips. The lines and rings will form the air channels after the mold cures.
Figure 3E:
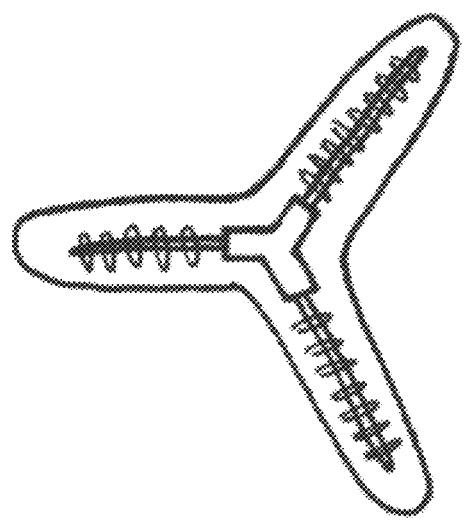
FIG. 3E is a schematic drawing of a mold of a three arm center restraint design which accommodates better air flow to the tips of the fingertips. The lines and rings will form the air channels after the mold cures.
Figure 3F:
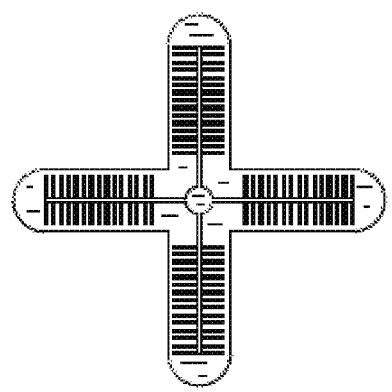
FIGS. 3F-3H are a series of photographs and schematic drawings representing an exploded view of gripper options.
Figure 3G:
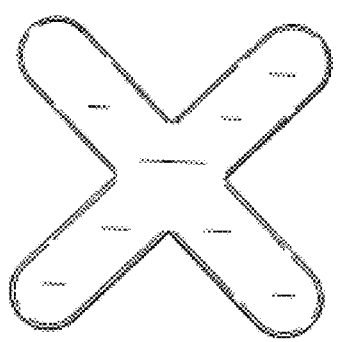
Figure 3H:
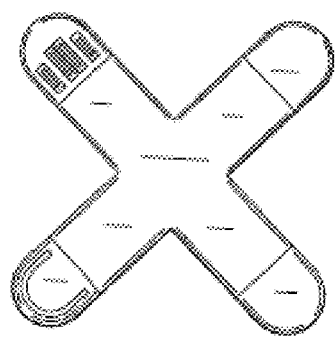
Figure 4A:
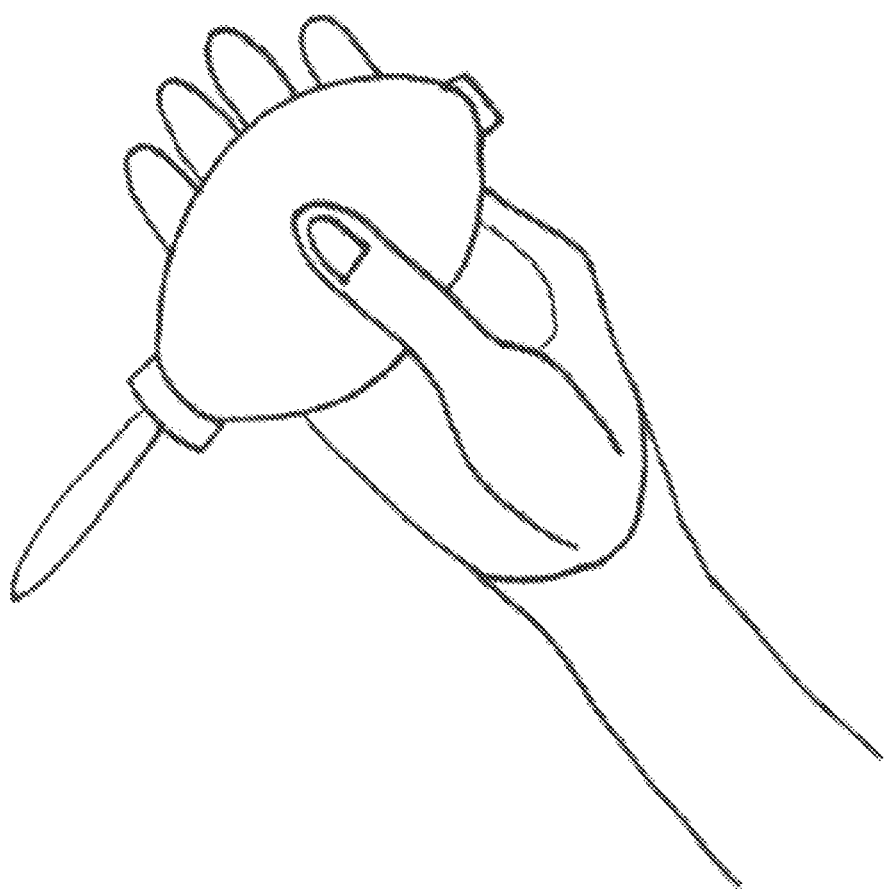
FIG. 4A is a schematic drawing of a hand holding a pump which can be used to actuate the gripping device, such as those shown in FIGS. 3A and 3B.
Figure 4B:
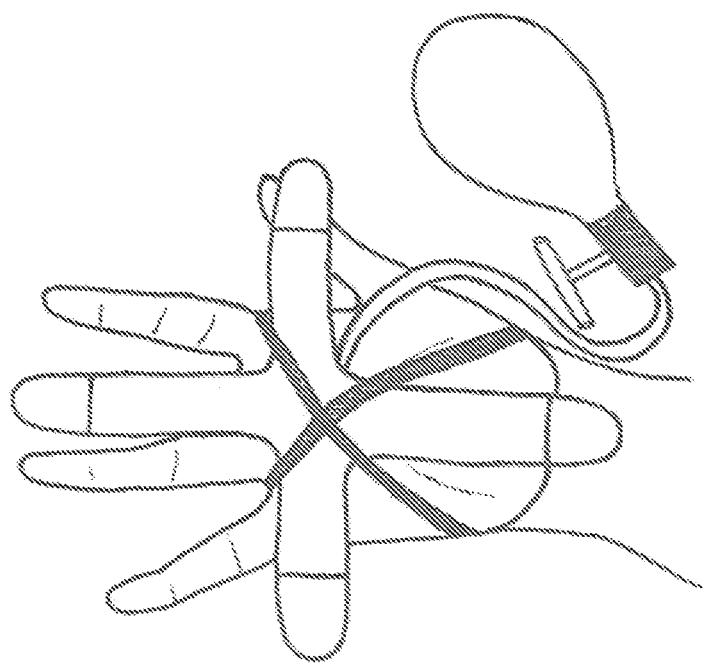
FIG. 4B is a schematic drawing showing the gripper configured for attachment to the hand and attached to an air source via an inflatable bulb, servo, or pneumatic actuation by a switch. Macro and micro control of inflation of various features can be controlled both in the main body and the skin.
Figure 16:
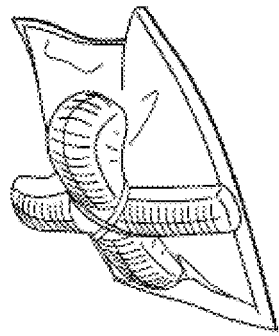
FIG. 16 is a series of photographs showing the gripper picking up an object with air pressure under 4 psi.
Figure 16:
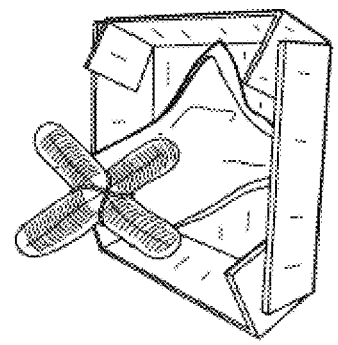
Figure 16:
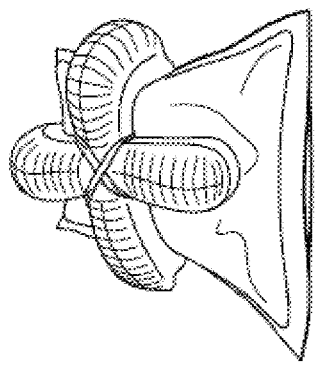
Figure 16:
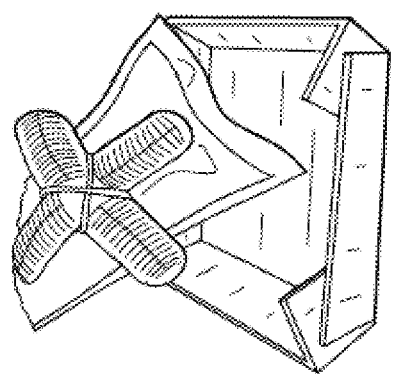
Figure 16:
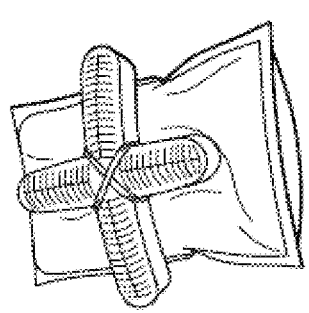
Figure 16:
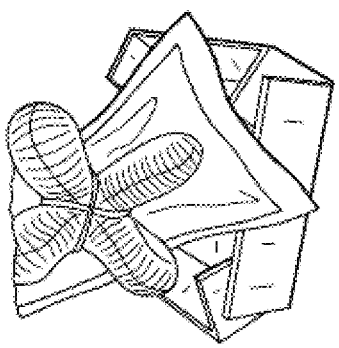

Robotic grippers are devices that are automatically controlled to grasp an object. The gripping device disclosed herein includes a gripper that may be designed and fabricated with modular components to assist a user to carefully grasp objects. Many different types of objects can be grasped by the gripper, including, for example, routine household objects, such as a door knob, silverware, drawer handle, bannister, or telephone. The gripper can be designed, for example, to be affixed or attached to a hand. The gripper can be fabricated by pouring a soft material (e.g., silicone, rubber, PDMS, and elastic polymers) into a mold (FIGS. 1A-1F). The mold may have a shape that can accommodate a gripping motion, such as a cross (FIGS. 1A-1F), a cross with accentuated fingertip grips (FIG. 2A), a claw (FIG. 2B), or a shape that mimics a hand or fingers. The accentuated finger grip design may allow for enhanced gripping ability or dynamic sensitivity by further conforming to an object. The surface of the gripper can be textured (e.g., with ridges, ripples, and protrusions) or flat depending on the user's preference (FIGS. 2C-2I). Additionally, the gripper can be customized and/or supplemented with interchangeable parts and modular add-ons/attachments that can be replaced or interchanged to improve grip and sensitivity, as required by the user. For example, different sensors or tip attachments (e.g., fingertip mimics and grip enhancers, such as gaskets, sponges, seals, cushions, rubberized dots made of the same or a different material) can be added or removed. The gripping material may be modified or substituted to provide increased or decreased grip by altering the physical properties of the material, thereby altering the physical properties of the gripper. The number of actuatable arms or the size and shape of the gripper can be tailored to a specific use or user depending on the context of use or shape and/or weight of object to be gripped. The cross or claw shape can allow the gripper to have flexibility by center restriction, as described in Example 5, allowing the fingers or tentacles of the gripper to fold around the center restriction. The flow of air and thus the bending can be adjusted with center restraint. Different designs of the center hole can help move more air into the arms than being wasted inflating the center (FIGS. 3D-3E). In one prototype a tension band across the center helped move air into the arms (FIG. 16).

Figure 5:
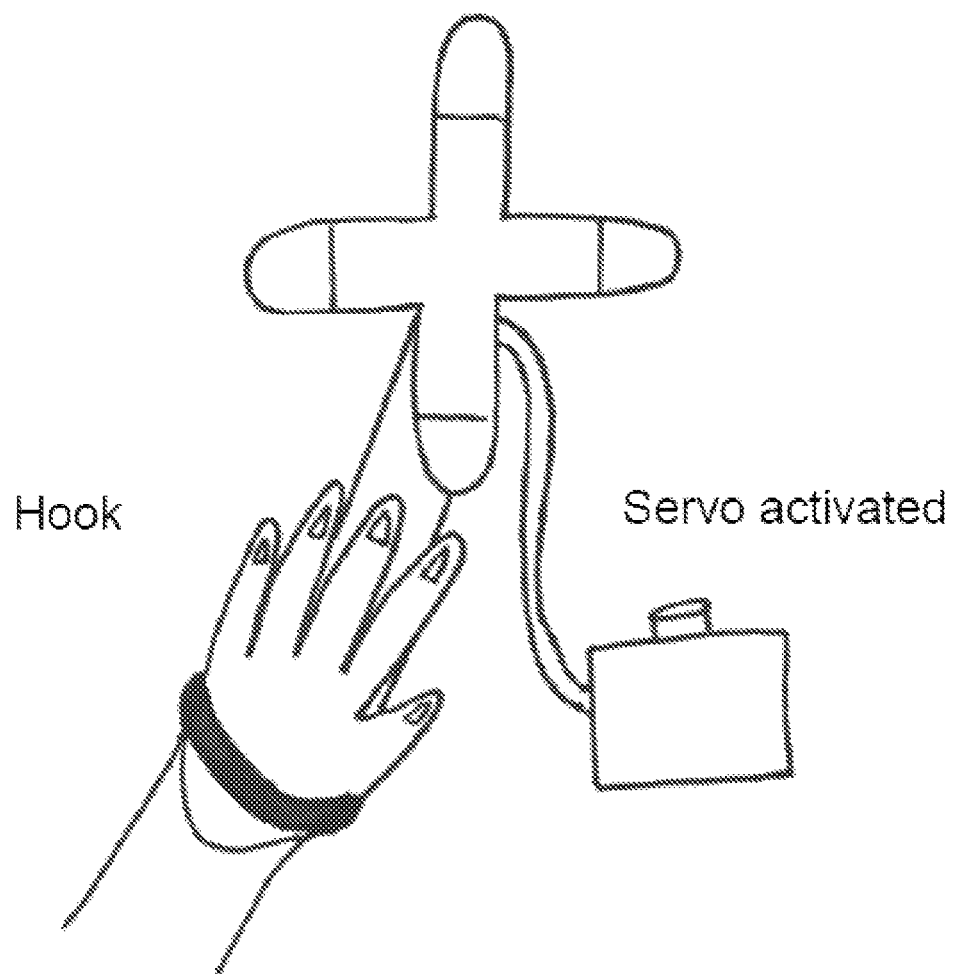
FIG. 5 is a schematic drawing of the gripping device affixed to a rod, which is affixed to the hand of a user by a hook. The gripping device is servo activated.

The physical structure of the gripper can include external skin and internal air holes which can be inflated via actuation with a fluid (e.g., air). The gripper can have the shape of a hand and can be configured as, or incorporated into, for example, a glove. The device can be attached to the hand with straps, such as rubber, leather, or VELCRO® straps. The gripper can also be mounted on a rod, as shown in FIG. 5, to provide extension beyond the normal reach of the user.

Figure 6:
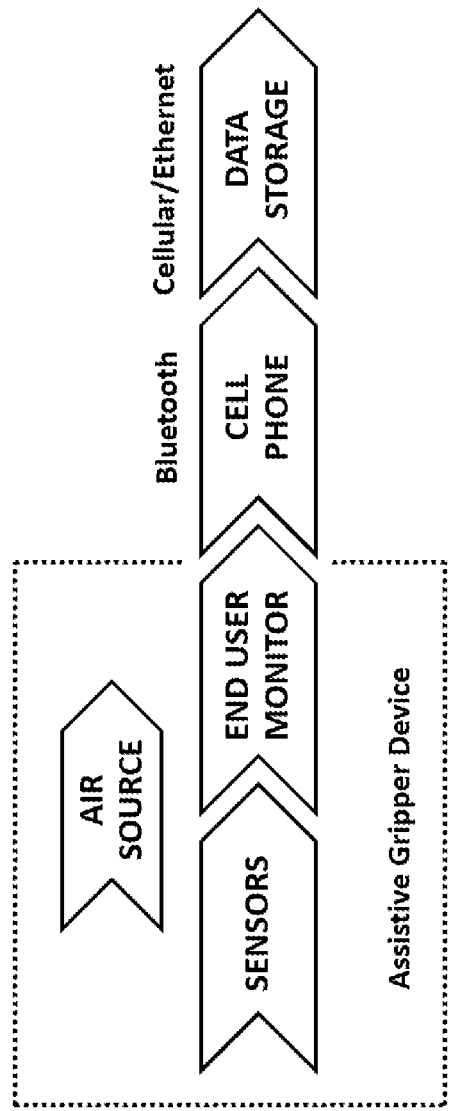
FIG. 6 is a flow chart showing the various components of the gripping device (sensors, air source, end user monitor), which can be integrated with a peripheral device, such as a cell phone and a data storage device.
Figure 7:
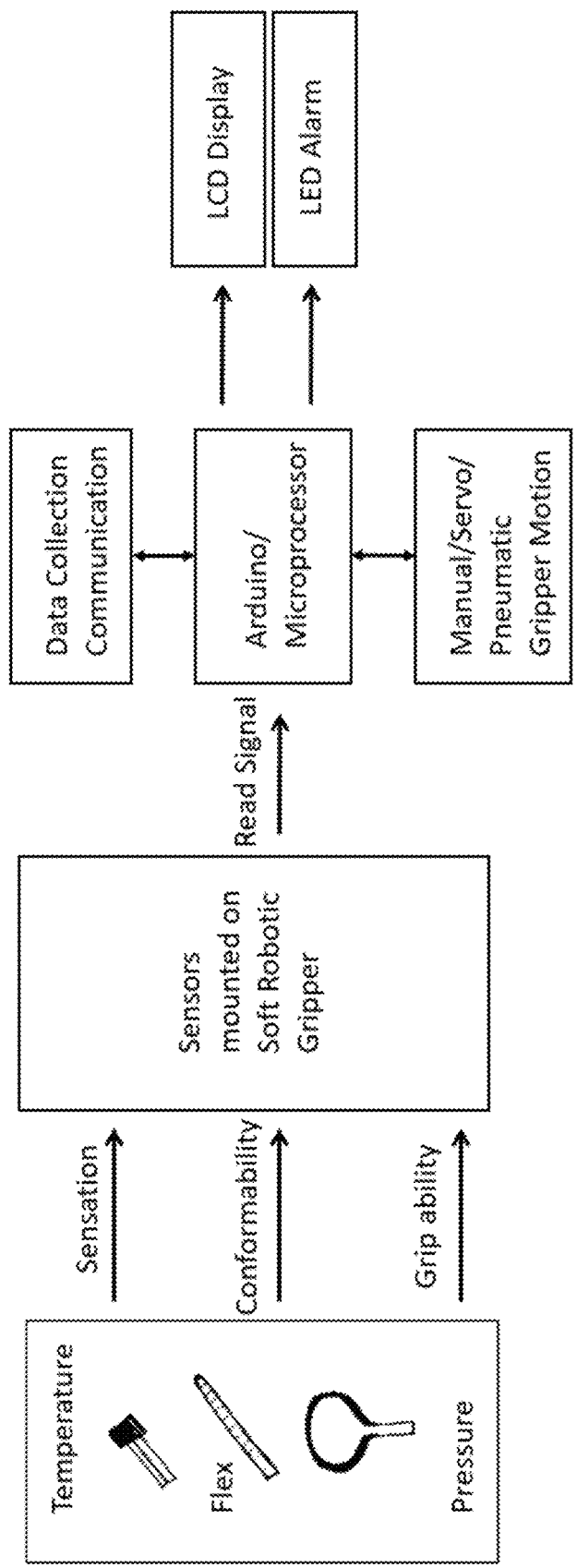
FIG. 7 is a set of photographs and images showing or representing the various components of the gripping device.
Figure 20:
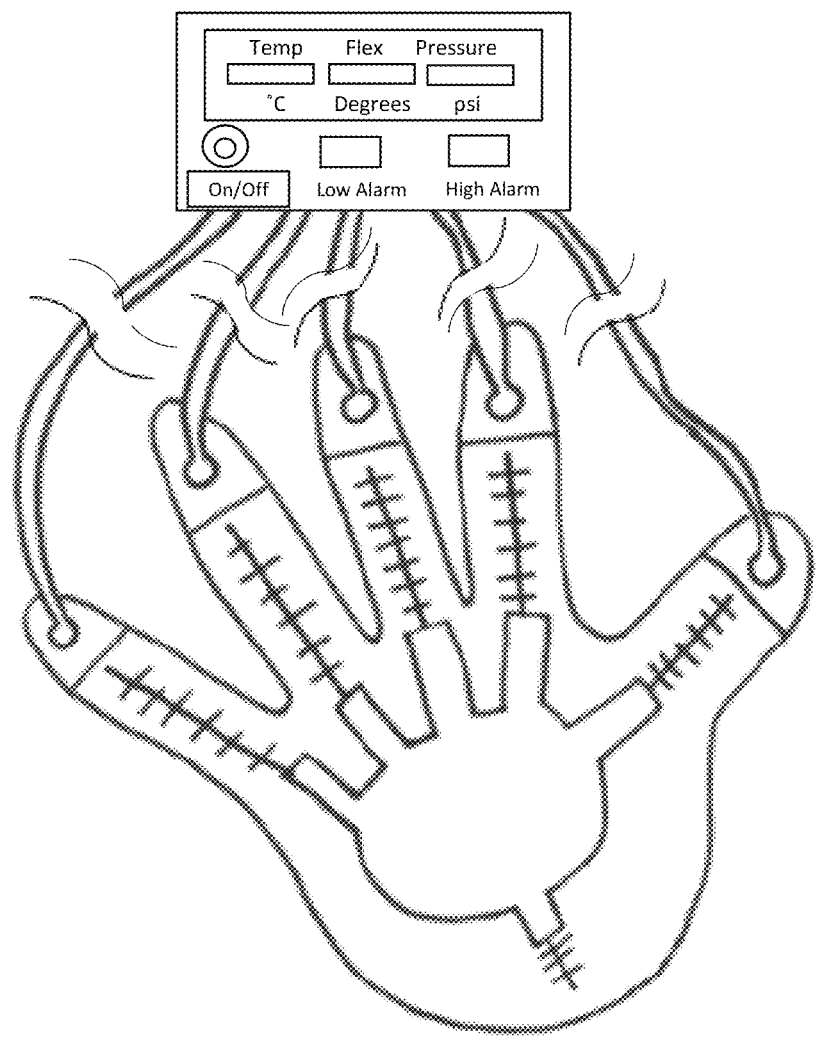
FIG. 20 is a schematic drawing of a gripping device connected to a peripheral device showing temperature, flexure, and pressure parameters measured by the sensors. Also shown is an on/off switch, a low threshold alarm, and a high threshold alarm. Wavy lines indicate a symbolic break in the length of the connections, which are not drawn to scale.

The soft robotic gripper may be connected to one or more of the same or different sensors (e.g., pressure, flex, temperature, and motion sensors). A microprocessor and peripheral device may be connected to the sensors to display information about the sensor data. The gripper can also be attached to a user interface (e.g., wired or wirelessly, such as via Bluetooth). The device also may include an electronics board (FIG. 3A). The electronics board contains a microprocessor to collect and store sensor data, as well as to control the movements of the soft robotic component of the gripper. The gripper can also be attached to a peripheral display device that displays various sensor data or warnings (FIGS. 3B and 20). A schematic of the components of a gripper of the invention is shown in FIG. 6, including an air source, sensors, an end user monitor, and an electronics component, including Bluetooth capability and a data storage component (e.g., hard drive transmitter to WiFi, which uploads to a cloud storage) that is accessible by a WiFi, cellular, or Ethernet connection. A picture of these components is shown in FIG. 7. The data storage device is a non-transitory computer storage media.

Figure 8:
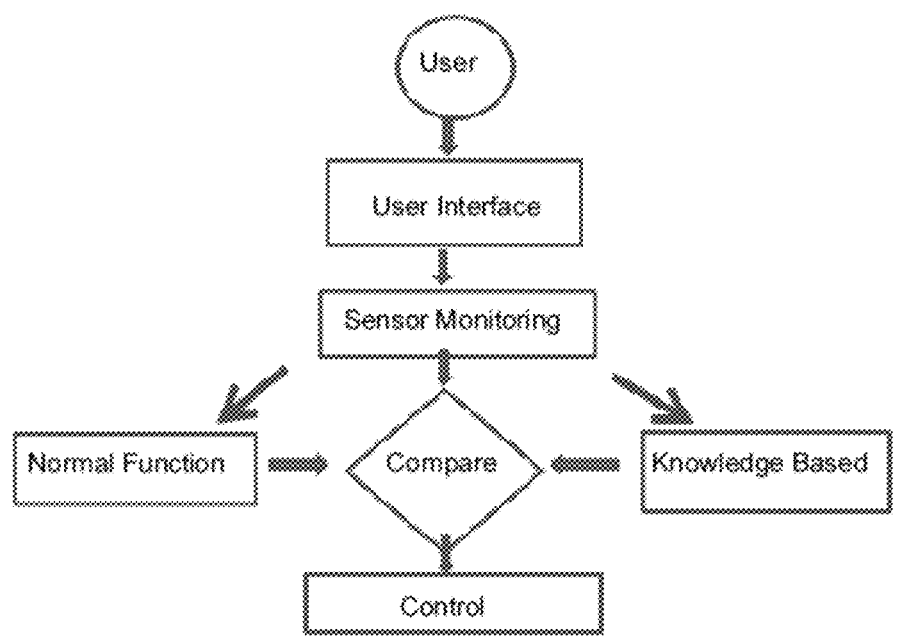
FIG. 8 is a flow chart illustrating an artificial intelligence algorithm that can be used with the gripping device.
Figure 9:
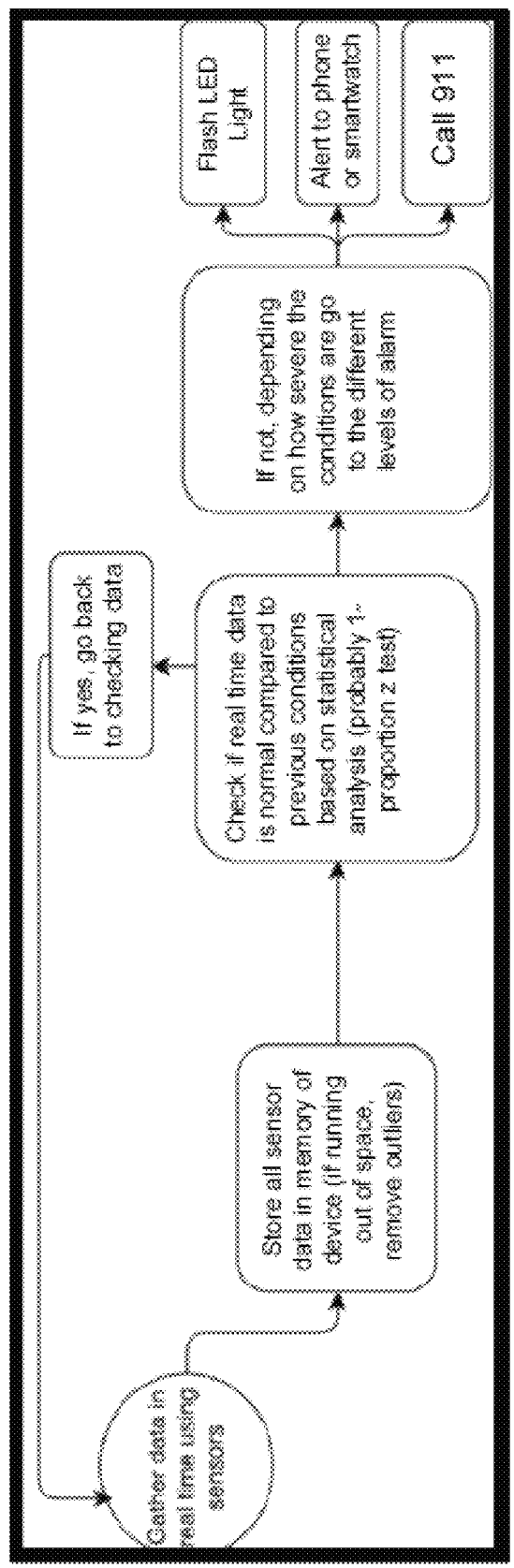
FIG. 9 is a flow chart illustrating an algorithm that can be implemented with a gripping device of the invention to provide an alert the user or a third party (e.g., health care provider, paramedic, health monitoring center, and hospital).

To use the device, a user can press a button or switch on a user interface that opens a valve for a fluid or a gas, such as air, to actuate the soft robotic gripper. As the fluid or gas actuates the gripper, the gripper bends around to grip an object, such as a door handle, silverware, a drawer handle, or a railing. Next, the sensors on the gripper can measure a sensory component (e.g., temperature, flexure, pressure, and/or motion). The data is collected by a microprocessor and can be analyzed and compared to predefined alarm limits set in the device (FIG. 8). A user can preset the alarm limits by defining a normal range of sensory stimulus, such that when the sensor senses outside the range (e.g., temperature above 37° C. or below 0° C.), the alarm will be triggered. Then a display screen on the device's user interface or on a connected peripheral device can also alert the user if the values are above or below the set limits, thereby notifying the user that the stimulus being sensed is outside of a normal or predefined range (FIGS. 9 and 20).

Soft Robotics

The soft robotics structure of a robotic gripper of the invention is made with elastic materials that provide flexibility, bendability, adjustability and customization of the gripping component. Examples of materials that can be used include silicone (e.g., PDMS), rubber, silicone rubber (e.g., ECOFLEX® 00-30 and ELASTOSIL® 4601), latex, polyurethanes, vulcanized rubber, and polymeric materials. Additionally, soft robotics provide flexibility through larger degrees of freedom of motion and higher sensitivity to enable grasping delicate objects as compared to hard robotics. Soft robots are comfortable, inexpensive and can conform better to the objects.

Soft robotics can make use of elastic polymers to provide the variability of functional movements achieved by the gripper. Soft robotics also entails using pneumatically driven actuators that are fluidly coupled to sealed chambers. The chambers fill with air, through a pressurizing inlet and expand the gripper arms in specific directions. The pressurizing inlet is connected to a source of air. The actuation pressure, materials, rubber skin thickness, mechanical properties, and restraints of various areas of the gripper can be adjusted to modulate the functionality of the gripper.

Another unique feature of the gripping device invention is grip control and sensitivity in the finger area or extremities of the hand. The silicone materials are poured and cured into a 3D-printed mold, which creates the body of gripper with small aft tubes structured for aft flow (channels 1-2 mm). For the skin cover, another layer is poured into a separate mold (e.g., 3D printed or made of aluminum) with surface features and microchannels. The body and skin can then be joined with a thin layer of silicone as a glue layer. Once it cures, it encloses the aft channels that, when inflated with an air source, allow actuation of the gripper. The skin layer may be about 2 mm thick (e.g., 0.5 mm, 1 mm, 1.5 mm, 2 mm, and 2.5 mm) and can have various combinations of modular design enhancements for improving finger grip such as a raised structure, ribs, knurl texture, gaskets, grooves, and micro channels (e.g., 100-500 µm) for fine grip control. These micro channels can also be pressurized by aft to optimize local grip control in extremities. The micro channels and textured features may be fabricated by lithography or 3D printing. The aft channels can also be fabricated by pouring the mold over a thin wire. Once the mold cures, you can dissolve the wire (e.g., with acetone) leaving a thin channel. By fabricating the skin layer separate from the molded body, the ability to interchange different skins with different bodies permits enhanced customization.

The molded body can be made from a soft Silicone material in the durometer range of Shore 00-30 to Shore 30A, while the skin can be made of soft silicone materials in the durometer range of Shore 00-30 to Shore 50A.

Figure 18A:
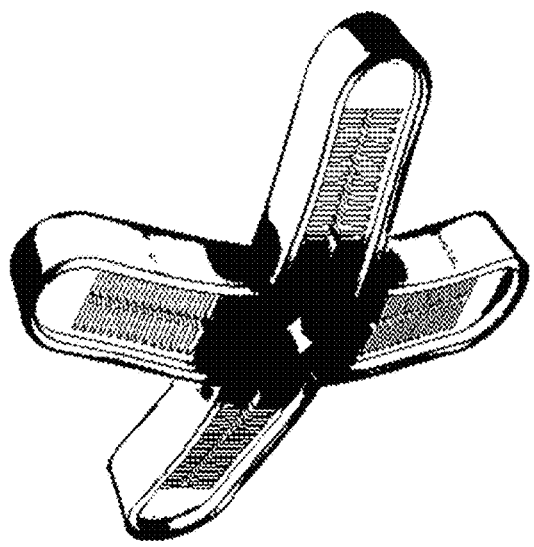
FIG. 18A is a series of images from the FEA analysis showing results of displacement with center restrained faces.
Figure 18A:
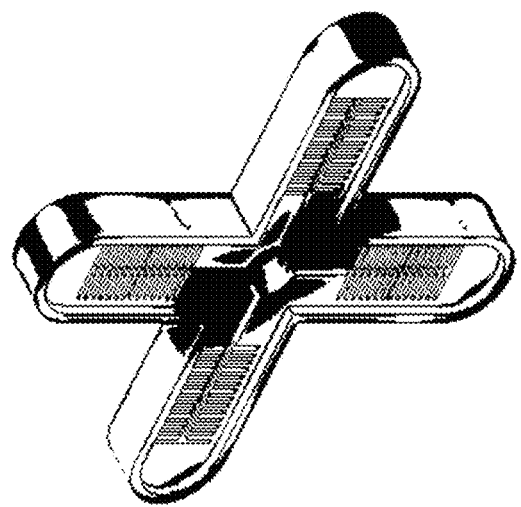
Figure 18A:
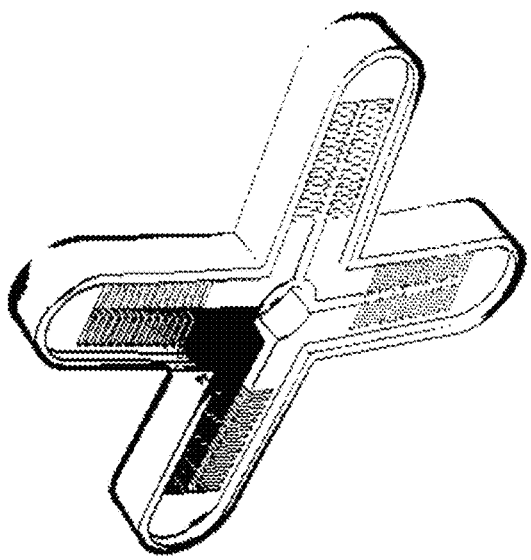
Figure 18B:
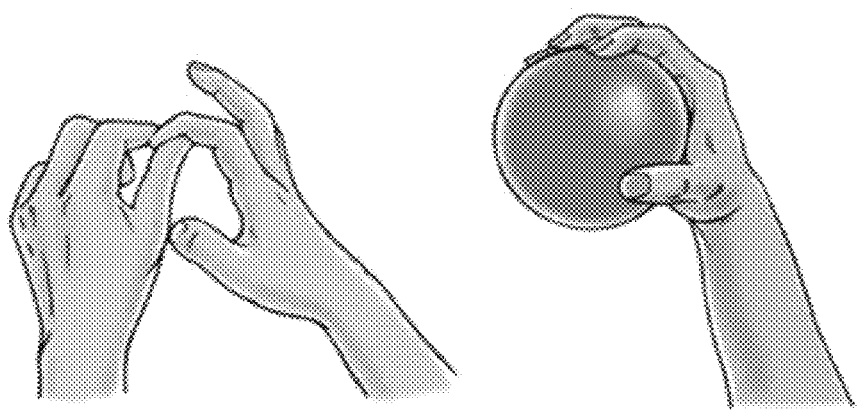
FIG. 18B is a series of photographs of a hand illustrating the bending of finger joints required for proper grasping.
Figure 18C:
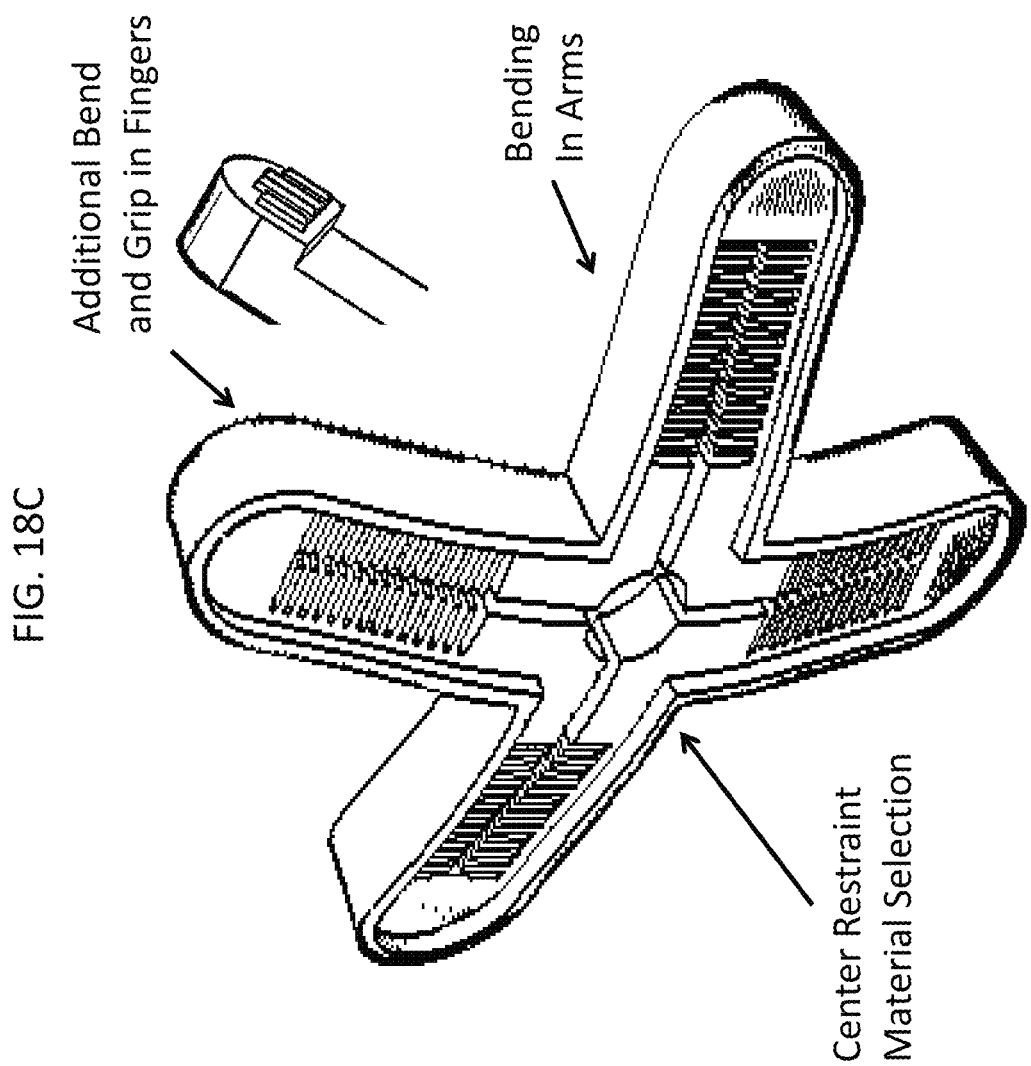
FIG. 18C is an image from the FEA analysis showing how the movement, flexibility, and displacement of the gripper arms can be modeled to mimic the joints of a hand.

The design of the gripper can include a modular finger area skin mold change that can provide various configurations of finger shapes and design as shown in FIGS. 1-3. The grip ability is enhanced by changing the finger area grip surface with a ribbed or textured skin which increases grip ability (FIGS. 2C-2P, 3C). The skin finger area may have a second pressurizing inlet and air source for micro control in the grip area or may be actuated by the same main pressurizing inlet and same air source. The air control in modular finger tips coupled with center constraint in the middle of the molded body may allow more bending in the fingertip area. The flow can be blocked off to certain arms or regions for individual or certain combination arm movements. Micro channels can also be fabricated in the joint areas of the gripper, to mimic the joint bending of fingers (FIGS. 18B-18C). An exploded view of possible gripper components and modular options is shown in FIGS. 3F-3H.

Soft robotic actuators have been described, for example, in U.S. Pat. No. 9,464,642, the disclosure of which is herein incorporated by reference. A fluid source, such as a squeeze bulb, gas canister, or air pump may be used to fill the chambers and actuate the gripper. The fluid source may provide a series of pressurization and depressurizations to control the precise movements of the actuatable arms. The pressurization and depressurization steps may be computationally controlled (e,g, by a microprocessor) to perform the specific movements and motions or the gripper arms. The pressure settings of the fluid source (e.g., increase or decrease) may also be modulated to control these pressurization and depressurization steps. The gripper may have one or more (e.g., 2, 3, 4, and 5) inlets to receive a fluid. For example, the micro channels in the fingertips may have a separate pressurizing inlet than the channels of the main gripping body.

Strain is a measurement of relative deformation of a material from a reference configuration. A deformation results from a stress induced by an applied force, such as a pressurizing force from air, a fluid or gas. A material with a high elastic modulus will not deform as much under the same stress as a material with a low elastic modulus. Materials with a lower stiffness (e.g., Young's Modulus) or elastic modulus are more expansible or extensible, while materials with a higher stiffness or elastic modulus are less expansible or extensible and can function as the skin layer in an actuatable arm.

Figure 17B:
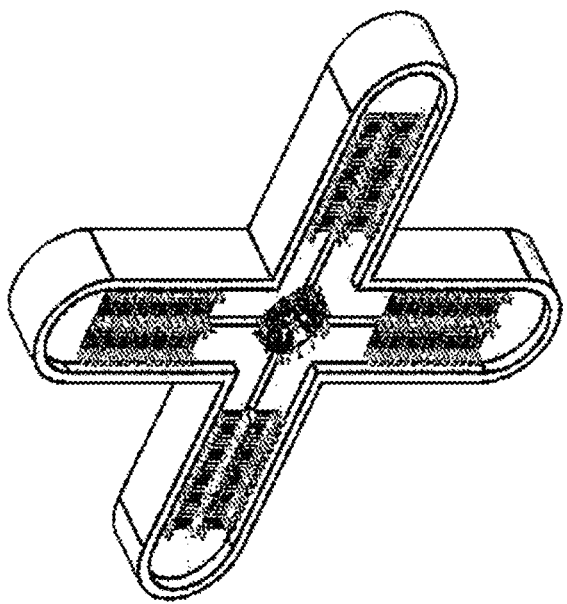
FIG. 17B is a schematic drawing of the FEA model of pressurization through the channels with center restrain.
Figure 17A:
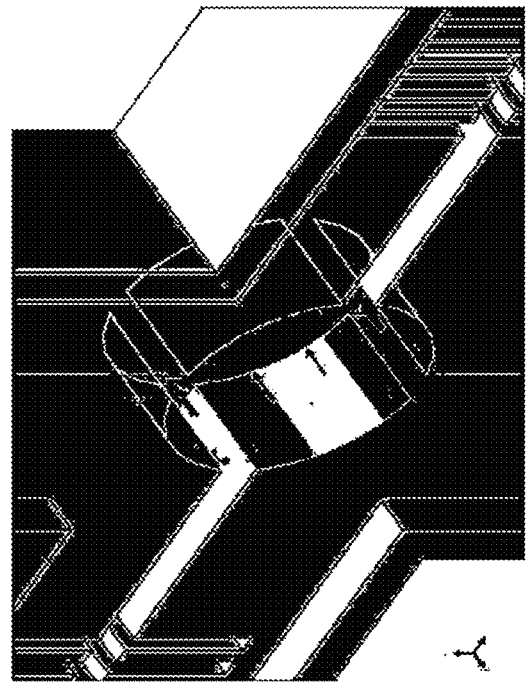
FIG. 17A is a schematic drawing of close-up view of the Finite Element Analysis (FEA) model of pressurization through the channels with center restrain.

Various areas or faces of the gripper, including the actuatable arms, may have restraints in different areas, such a center restraint or restriction (Example 5, FIG. 17-18) to provide more bending in certain areas and enhanced gripping ability. As shown in FIGS. 17A-17B, the cylindrical center air channel contains four 90° arcs corresponding to the four vertices of each pair of actuatable arms. When the elastic modulus or stiffness of each arc of the center restraint is modulated, (e.g., 1, 2, 3, or 4 arcs are modulated with increased or decreased stiffness) it modulates the ability of the actuatable arms to curl around and grip an object with increased sensitivity and precision. The center restraint may be modeled and predicted by finite element analysis (FEA) using the SOLIDWORKS® software suite (Waltham, Mass.). FEA modeling can help understand the effect of material, design and pressure on potential improvements in how the gripper behaves, and it can predict the flexibility, stress, strain, bend, twist, and displacement (e.g., expansion) of the gripper arms at certain forces when the gripper is restrained in a different number of arms or faces (e.g., 1, 2, 3, 4, and 5). It can also be used to predict motion. The design can be altered by stiffening the center area so maximum deflection is seen in the arms. The FEA simulation can also be used to change pressure values and material properties, thus making it a useful tool to evaluate how the gripper will behave under fluid actuation. One way to achieve center restraint is to use materials with different elastic properties or different shore hardness (e.g., as measured by a durometer). For example, the center area may be comprised of a material that is actuated at 15 psi, while the arms are comprised of a material that is actuated at 5 psi. Then, when the whole gripper is under 5 psi pressure, only the arms will move while the center restraint will not. This prevents air from being trapped in the center of the gripper (top right panel of FIG. 15) and forces it towards the actuatable arms. The center restraint may contain a physical barrier such that the center region is comprised of one homogenous material and the arms of a second homogenous material. The center restraint may also be configured as a gradient such that the stiffness of the material gradually decreases radially from the center restraint. Furthermore, different portions, layers, or compartments of the molded body may be comprised of one or more different materials or materials with different thicknesses, such as to provide different mechanical properties in different regions of the arms of the gripper. A layer of the material may be comprised of two or more different materials (e.g., rubber embedded with graphite). By using additives to layers or regions, the stiffness of the material can be increased or decreased. By tailoring the mechanical properties of each portion, layer, or compartment, the gripper can be customized to conform to specific objects and fit according to a user's preference. Another example of a material that may be used for the skin material is Polydimethylsiloxane (PDMS Sylgard 184 by Dow Corning), such as in the fingertip area. This can be used for better gripping, comes in a wide shore hardness range, and can also be potted with micro channels using standard techniques, such as soft lithography.

Sensors

The gripper can include sensors that allow the gripper to be used under different sensory conditions. For example, the gripper can be modified with a temperature sensor that allows the detection of a hot or cold condition. The sensors may be attached or affixed to the surface of the gripper (e.g., gripping surface) as a modular component or integrated into the device, e.g., into a surface of the device. A user may affix the gripper to their hand before touching an object that may be hot or cold (e.g., a hot pan after cooking or an ice cold drink). The temperature sensor collects data on the temperature of the object. A microprocessor compares current temperature data to a calibrated comfortable temperature range. The device alerts the user if the temperature of the object is too hot (e.g., greater than 20° C., 30° C., 40° C., 50° C., 60° C., 70° C., 80° C., 90° C., and 100° C.) or too cold (e.g., less than 20° C., 10° C., 0° C., −10° C., −20° C., −30° C., −40° C., −50° C., and −60° C.), such as with a flashing LED message or phone alert.

Other sensors can also be used to sense flexure, hyperextension, compression, pressure, or motion. A flex sensor can constantly measure angle of bending in fingers relative to a resting position. If the bending goes outside of a comfortable range (e.g., 0-150°), the device alerts the user. The pressure sensor can constantly measure pressure exerted on the hand or finger. If the pressure goes above a tolerable limit (e.g., greater than 5 psi, 10 psi, 20 psi, 30 psi, 40 psi, 50 psi, 60 psi, 70 psi, 80 psi, 90 psi, and 100 psi), the device can alert the user. A motion sensor can activate the gripper to grasp an object when it comes within a certain distance (e.g., 10 cm, 20 cm, 30 cm, 40 cm, 50 cm, 60 cm, 70 cm, 80 cm, 90 cm, and 100 cm) of the gripper. Any type of sensor may be integrated with this device (e.g., infrared, chemical, torque, speed, electrical, optical, light, and position, and those listed in Table 1).

TABLE 1

Types of Sensors

| Sensors | Catalog # | Manufacturer | Supplier |
| --- | --- | --- | --- |
| Temperature | TMP 36 | Analog Devices | Spark Fun Electronics Niwot, CO, USA |
| Pressure | Flexiforce A301 | Tekscan | Spark Fun Electronics Niwot, CO, USA |
| Pressure | Flexiforce A401 | Tekscan | Spark Fun Electronics Niwot, CO, USA |
| Force/Torque Sensor | Nano17 | ATI Industrial Automation | ATI Industrial Automation Apex, NC, USA |
| Flex | Flex 2.2 | Spark Fun | Spark Fun Electronics Niwot, CO, USA |
| Altitude Pressure Breakout Board | MPL3115A2 | Spark Fun | Spark Fun Electronics Niwot, CO |
| Magnetic sensor | Model 130 TrakStar | NexGen Ergonomics Inc | Pointe Claire, Quebec, Canada |
| Sensor kit DEV-13754 | LDT0-028K Vibration APDS-9960 Gesture sensor QRD1114 Infrared Si7021 Humidity/Temperature SEN-12642 Sound detector SEN-13285 Motion detector | Sparkfun | Niwot, CO |

Microprocessor

Figure 21B:
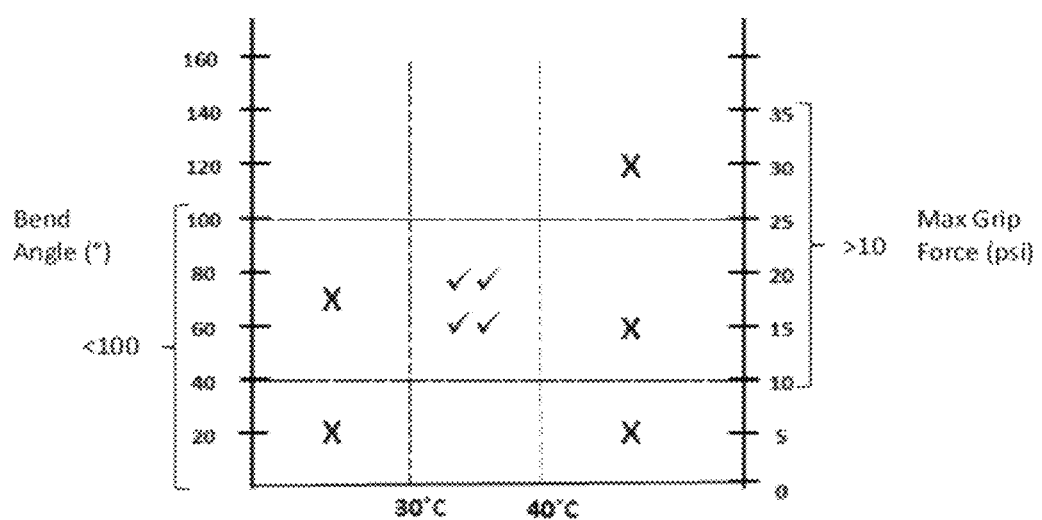
FIG. 21B is a multi-parameter graph illustrating how grip function is triggered at certain bend angles, temperature ranges, and grip forces. The check marks indicate that grip function is triggered, while the x marks indicate that grip function is not triggered.

The gripping device can further comprise a microprocessor connected to the sensors. A microprocessor (e.g., Arduino Uno R3 from SparkFun, Niwot, Colo.) may be connected to the sensors by an electrical wire or wirelessly to interpret, characterize, and store data and information collected by the sensors. The microprocessor can take the input stimuli from the sensory data and convert that into an output decision (e.g., robotic motion). The microprocessor can be programmed with artificial intelligence software. Python and Java programming can be used for the application that allows the gripper to adapt to and learn about user patterns and/or preferences. Examples of algorithms used by artificial intelligence software are shown in FIGS. 8-9. A user can interact with the gripping device via a user interface, such as a peripheral device (e.g., smartphone or tablet), and program the defined parameters (e.g., normal range of temperature, pressure, and flexure) of sensor monitoring (e.g., by pressing a button on the peripheral device). The microprocessor can then store and compare sensor data in real time to normal function and adapt to changes by the user. The microprocessor can perform a statistical analysis to compare real time data with data previously collected in certain conditions. These data are then integrated into a decision making algorithm that controls the gripping device by retracting the lateral, bending, or twisting motion of the arms (FIGS. 21A-21B). For example, if the sensor senses extreme heat (e.g., greater than 60° C., 70° C., 80° C., 100° C., 120° C., 140° C., 160° C., 180° C., and 200° C.), it may cause the gripper to move the fingers away from the heat source by filling or deflating certain chambers of the gripper, thereby actuating the arms. A pressure release valve may be used to regulate pressure in bending actuators to bend the arms in the opposite direction as when inflated. If the sensor senses too little flexure during a gripping attempt, it may move the fingers toward the object being gripped.

The microprocessor may also be used to control the actuation steps of the soft gripper by initiating a series of pressurization and depressurization steps to provide the robotic motion of the gripper. The computer algorithms of the microprocessor may be controlled (e.g., by a user interface) to initiate the gripper to perform a desired movement or function.

Peripheral Device

A peripheral device (e.g., LED display, smartphone, and tablet) may be affixed or attached to the gripping device. The peripheral device may include a user interface such that the user has precise control over the functionality of the gripper. The peripheral device may be connected wirelessly (e.g., via Bluetooth or cellular) or wired to the device. The peripheral device may be a cellphone or watch of the user or another person monitoring the user, such as a medical professional or family member.

In some instances, the user can program the sensors of the gripping device with a predefined range of normal parameters. When the sensors detect a parameter outside of the inputted range, the peripheral device will alert the user. For example, a user using a gripper with a temperature sensor may select a normal temperature range of 15-37° C. When the temperature sensor detects a temperature outside of that range, the peripheral device will issue a warning or alert. The alert may be sent to the user, a third party, or to an emergency responder (e.g., paramedic, health monitoring center, and hospital).

The sensor thresholds can be calibrated to send an alert under different circumstances (e.g., higher sensor threshold or increased duration of time) or to alert different parties. For example, the peripheral device may alert the wearer to a temperature detected over 50° C., but alert an emergency responder only if the temperature exceeds 120° C. or higher that is detected for a sustained period of time (e.g., indicative of a burn). The peripheral device may include a user interface where the user can directly interact with and program the gripping device, such as with a touchscreen or keypad.

Peripheral Dysfunction

The gripping device described herein may be tailored for a user who is suffering from a peripheral dysfunction. A peripheral dysfunction is a condition in which the peripheral limbs or extremities do not function normally. For example, the function of the peripheral limbs or extremities (e.g., hand, finger, foot, or toe) is disrupted, resulting, for example, in muscle weakness or paralysis, loss of sensation, or sensation of pain. A person suffering from a peripheral dysfunction may have decreased or complete loss of grip, sensation, or movement in the hands and feet or an inability to precisely control some or all of their extremities.

A peripheral dysfunction includes a peripheral neuropathy caused by, e.g., disease or injury. Examples of diseases resulting in peripheral neuropathies include, for example, Friedreich's ataxia, Fabry disease, Charcot-Marie-tooth disease, diabetes, diabetes mellitus, chronic kidney failure, porphyria, amyloidosis, liver failure, hypothyroidism, Guillain-Barre syndrome, system lupus erythematosus, leprosy, multiple sclerosis, Sjogren's syndrome, Babesiosis, Lyme disease, vasculitis, sarcoidosis, and vitamin deficiencies (e.g., $B_{12}$, A, E, and $B_1$). Peripheral neuropathies may also be caused be toxic agents (e.g., drugs, alcohol, and fluoroquinolones), chemotherapy, radiation or electric shock. Physical trauma can cause a peripheral neuropathy, such as a traumatic brain injury or severe compression of the nerves ("compression neuropathy," such as carpal tunnel syndrome and axillary nerve palsy), as well as infection.

Other diseases that cause peripheral dysfunctions include neurodegenerative conditions (e.g., Alzheimer's disease, Parkinson's disease, and amytrophic lateral sclerosis (ALS)). In some instances an injury (e.g., broken bone, ligament or tendon tear, and sprain) or osteoarthritis can cause a peripheral dysfunction.

Diabetic neuropathies are caused by nerve damaging disorders associated with diabetes mellitus. These conditions result from diabetic microvascular injury involving small blood vessels that supply blood to nerves. Common diabetic neuropathies occur in the hands and feet.

Use of the Device to Rehabilitate a Patient Having, or to Monitor Progress of, Peripheral Dysfunction The gripper can have multiple uses. For example, the gripper can be used as an assistive device to improve a patient's (e.g., patient with a peripheral dysfunction, such as peripheral neuropathy, diabetic neuropathy, and peripheral limb injury) ability to conduct daily routine activities. A gripping device that contains a disposable soft robot with re-useable sensors can be used to provide the sensation, conformability, and grip-ability needed to perform daily routine activities, such as turn a door handle, grasp silverware, or open a drawer knob, for many users or patients.

The gripper can also be used as a monitoring device. The gripper can be a non-invasive way of monitoring progression of a disease or injury (e.g., peripheral neuropathy, diabetic neuropathy, and peripheral limb injury). The gripper can also be used to collect information and learn about the disease as it progresses, e.g., via artificial intelligence. For example, the device can monitor if the user can function properly using the gripper with a certain configuration of function (e.g., the user can touch a "Yes" or "No" option on the user interface). As the condition deteriorates, if the user has to add more features or sensitivity to the device to achieve normal function, one can track this as a monitor of disease progression.

In one example, if the user sets the temperature or pressure sensor to sensitivity level 5 out of 10 and then needs to increase the sensitivity to 6, 7, 8, etc., as the disease progresses then this is indicative of the disease or condition worsening. In another example, the user may only be able to flex his fingers 20°, indicative of poor flexure. However, over time, the user is able to flex his fingers up to 60°, this is indicative of the disease or condition improving. In another example, a user requires a certain assistive gripping force to turn a door knob. The assistive gripping force required to turn the door knob is measured once per week. The microprocessor stores the data and tracks the gripping force required each time the exercise is performed. As the disease progresses, the microprocessor is able to output the data onto a peripheral device as a graph that tracks the change in assistive gripping force needed to turn the door knob versus time to illustrate the progression of the disease to the user.

The gripper can also be used as a training device, such as for physical therapy. For example, the gripper can be used to exercise muscles in the hand and to train the muscles in order to alleviate pain and improve peripheral dysfunction (e.g., peripheral neuropathy, diabetic neuropathy, and peripheral limb injury in, e.g., the hands). Small exercises are commonly used to help treat diabetic neuropathy. One of these exercises includes placing the palms of one's hands on a flat surface, and then raising and lowering each finger in succession. This exercise extends each finger for a short amount of time, making those muscles stronger and able to combat neuropathic symptoms. For patients with severe cases of neuropathy, the gripper can help them perform exercises such as this one. The gripper will do most of the work in moving the patient's fingers, but the patient will still experience the same benefit of performing the exercise. In one specific case, the actuatable arms of the gripper can be activated to move up and down, which in turn will move the patient's fingers, which are attached to the gripper. The gripper can also be adapted for pain reduction and physical therapy by incorporating heating elements into the gripper or by adding an electrotherapy component using conductive silicone grades of material. The gripper can function as a heat pad for the hand or provide electric stimulation to soothe pain.

Since diabetes is a progressive disease, a device with adjustable settings and modular components provides benefit. The gripper is customizable, e.g., by center restriction to manipulate the range of motion without negative side effects, such as loss of grip. The device described herein is configured to contain modular components (e.g., sensors, grip enhancements, such as a tacky substance, and textured gripping fingertips), allowing the user to adjust various settings and functionalities (e.g., pressure and grip) over time as the disease condition deteriorates or improves. Additionally, one can use different gripping devices with different physical characteristics (e.g., elasticity and stiffness) as the disease condition deteriorates or improves. One could also design color coded gripping devices such that the level of assistive force of the gripper or the specific patient is correlated with a color scheme.

EXAMPLES

The following examples are intended to illustrate, rather than limit, the disclosure.

Example 1. Building and Using the Gripping Device

The concept of the gripper prototype developed is shown in FIG. 7. There are three main components to the design of the soft robotic gripper: 1) a physical structure made of external skin and internal air holes which can be inflated called the actuator, 2) a pressure source, such as air, that can inflate the physical structure to conform to the object, and 3) a component for sensing and providing feedback on the actuation (sensor and controller). The gripper can then be actuated open or closed through use of a switched air valve. In this design, three different sensors were used for temperature (TMP36), flex (Flex 2.2) and pressure (Tekscan A301) with an Arduino microprocessor to collect real time data. LED lights or LCD display can be used to show the measured values.

To build the soft robot, a 3D printed mold was created as shown in FIG. 1. Two different Silicone materials were tested: ECOFLEX® 00-30 (Smooth-On Inc, Macungie, Pa.) and ELASTOSIL® 4601 (Wacker Chemie AG, Munchen Germany). These are two component (A&B) Silicone rubbers, the component B is the platinum catalyst that when mixed with the component A cures the silicone. The proportion of mixing and curing time is different for the two Silicone materials and technical data sheets were followed for instructions. Once the two components were mixed thoroughly, the mixture was poured into the mold and cured. The mold consisted of bunt in cavities which create air channels surrounded by the skin of the gripper, consisting of the same or a different material. Once the gripper is removed from the mold, a skin-like rubber material is added on the top to finish the gripper. Three different air source methods were used including a squeeze bulb, a ball air pump, and a dual action air pump with pressure read out (up to 25 psi). The dual action air source effectively actuates the inflation of the soft robot gripper. The Arduino Uno kit was used for data collection. Individual codes were used for each of the sensors. Each code reported data as a string that was then transferred into a spreadsheet.

Data was collected on each sensor to evaluate the linearity of the sensors along with how the soft robot gripper compares to the function of a hand. Three major end use functional areas of sensitivity, conformability and gripping were studied through temperature, flex and pressure sensors. To test the function, the sensors were connected to Arduino and data was collected as the sensors were deflected by the soft robotic gripper or the hand. The gripper design was further optimized by evaluating various factors related to material selection, design modification via center restraining and pressure of inflation. These factors were studied to evaluate improvements on bending of the gripper.

Example 2. Sensor Linearity

The three sensors used in this study were temperature (TMP36) for sensitivity, flex sensor (2.2) for conformability and the pressure sensor (FlexiForce A301) for grip ability evaluation. For the selection of the flex and pressure sensors, we used sensors that were flexible and can be potentially mounted directly on the soft robots and be able to flex with the soft robot. The first step was to study the individual sensors and their linearity in the range of operation. Each sensor was connected to the Arduino Uno processor to gather input and output values for the trend line (FIG. 10).

Figure 10A:
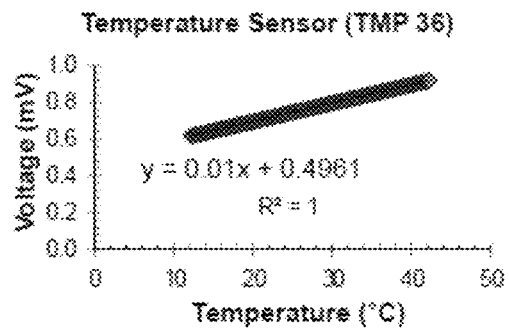
FIG. 10A is a plot of voltage vs. temperature for the TMP 36 temperature sensor incorporated into a gripper of the invention.
Figure 10B:
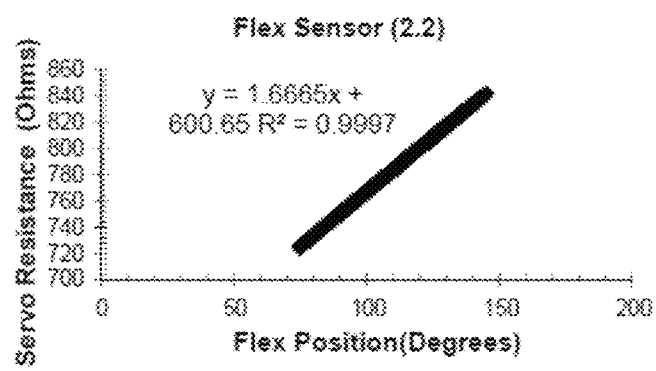
FIG. 10B is a plot of servo resistance vs. flex position for the 2.2 flex sensor incorporated into a gripper of the invention.

For the temperature sensor TMP36, we plotted the input temperature and the output voltage values (FIG. 3). Temperature was measured in ° C. and voltage in millivolts. TMP36 sensor has a value of 700 mV at 20° C. (typical room temperature). Body temperature is typically from 36-37.5° C. and the temperature study was conducted covering the range of 16-42° C. to evaluate the linearity of the sensor in this range simulating the comfort level of the hand. Beyond this temperature, the Arduino was connected to alarm via LED light or LCD display. The trend line correlation analysis results in an R2 value of 1 which suggests good linearity and sensitivity for the sensor in this working range (FIG. 10A). The flex sensor (Flex Sensor 2.2) is made of a plastic strip with a conductive coating. As it bends, resistance changes, and changes servo feedback. During the testing, as the flex sensor was bent from 0 to maximum 180 degrees (input), the output resistance was recorded at each step. As can be seen from the FIG. 10B, the flex angle can be detected with change of the resistance and is linear (R2=0.9997). The resistance range is from 600 to 900 typically. LED alarm is set up between 700 low and 800 high and was displayed as a light or LCD read out.

Figure 10C:
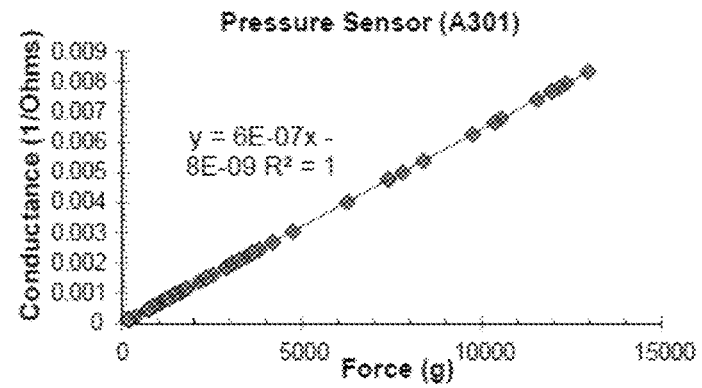
FIG. 10C is a plot of conductance vs. force for the A301 pressure sensor incorporated into a gripper of the invention.

FlexiForce pressure sensors have piezoresistive material in between two plastic polyester layers with printed silver conductors on each half. The sensor is an open circuit when there is no load. Once the force is applied resistance decreases and becomes conductive (1/R). For the pressure sensor (Tekscan A301) selected for this application, force is measured as inverse resistance (conductance). Data was collected for force (input) and conductance as the output and sensor linearity was established (R2=1) as shown in FIG. 10C.

Example 3. Soft Robotic Gripper Evaluation

Figure 11:
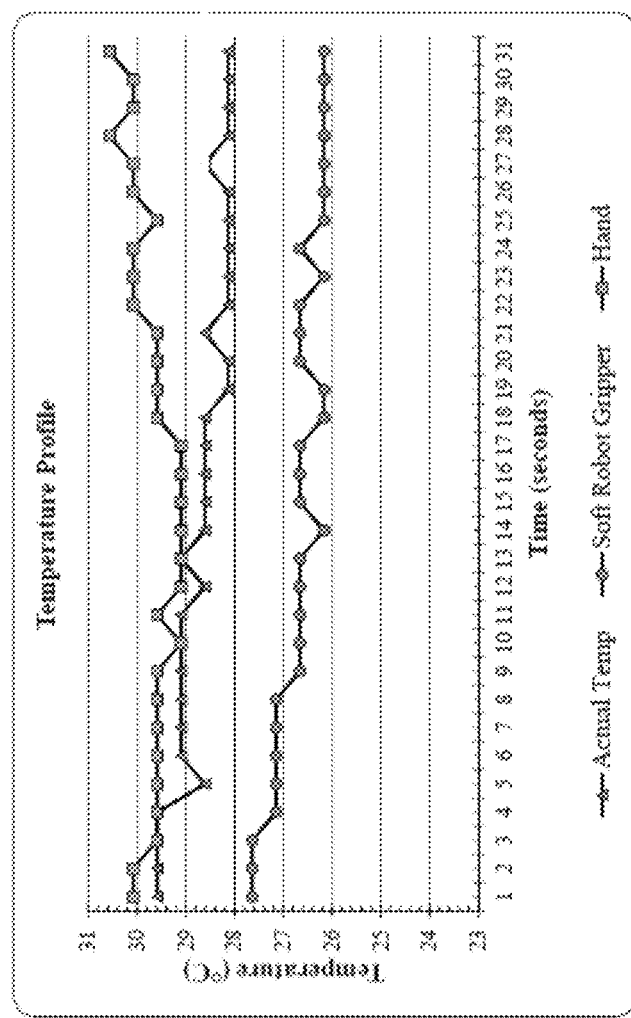
FIG. 11 is a plot of temperature vs. time as sensed in real time by the gripper.

Once the linearity of the sensors was established, the next step was to test them with the gripper. The gripper was made from ECOFLEX® 00-30. The soft gripper was tested with the sensors in the environment and changes in parameters were recorded over time to compare the soft robot data to that of actual temperature (FIG. 11). The actual temperature was measured in the range of 28-29.5° C., the hand in the range of 29-30.5° C., and soft gripper in the range of 26-27.5° C.

The graph in FIG. 11 shows the temperature profiles of actual temperature and temperature of the gripper and hand over time. To summarize the results, the gripper and actual temperature varied within 3 degrees of each other. Some temperature change is expected on touch due to heat transfer.

The experiment confirmed that the gripper temperature can be measured within 3 degrees of actual and can be used to detect too hot or too cold objects beyond the comfort range as selected. The response time was also evaluated in this experiment and the temperature was collected and recorded every second on Arduino program.

The flex sensor was used to evaluate the flexibility of the soft robot for the end application. This was evaluated via the bending function of the soft robot with respect to the hand by measuring deflection of the sensor from 0 to 180 degrees. The resistance was measured to characterize the bending of a soft robotic gripper and hand (FIG. 12).

Figure 12:
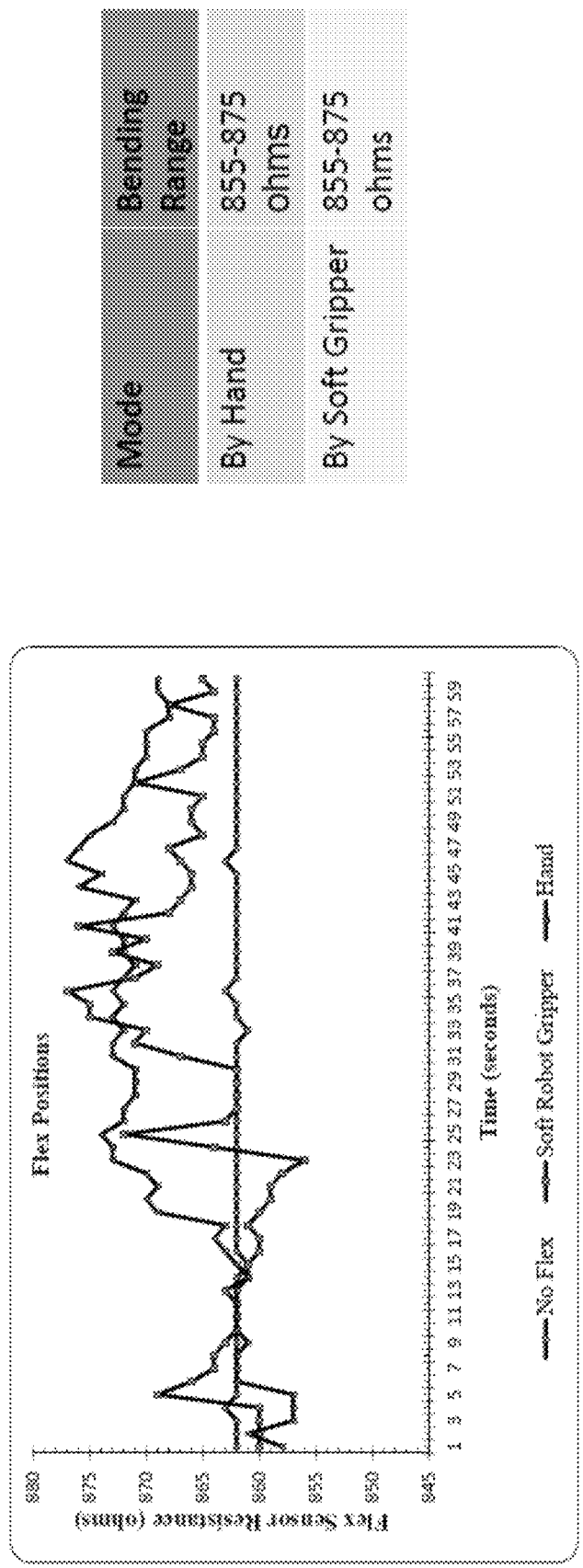
FIG. 12 is a plot of flex sensor resistance vs. time as sensed in real time by the gripper.
Figure 13:
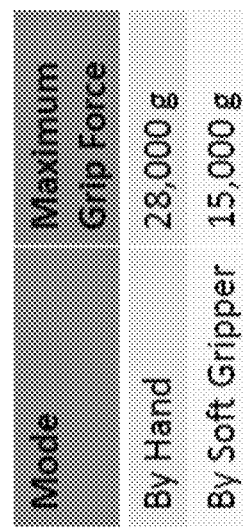
FIG. 13 is a plot of force vs. time as sensed in real time by the gripper.
Figure 13:
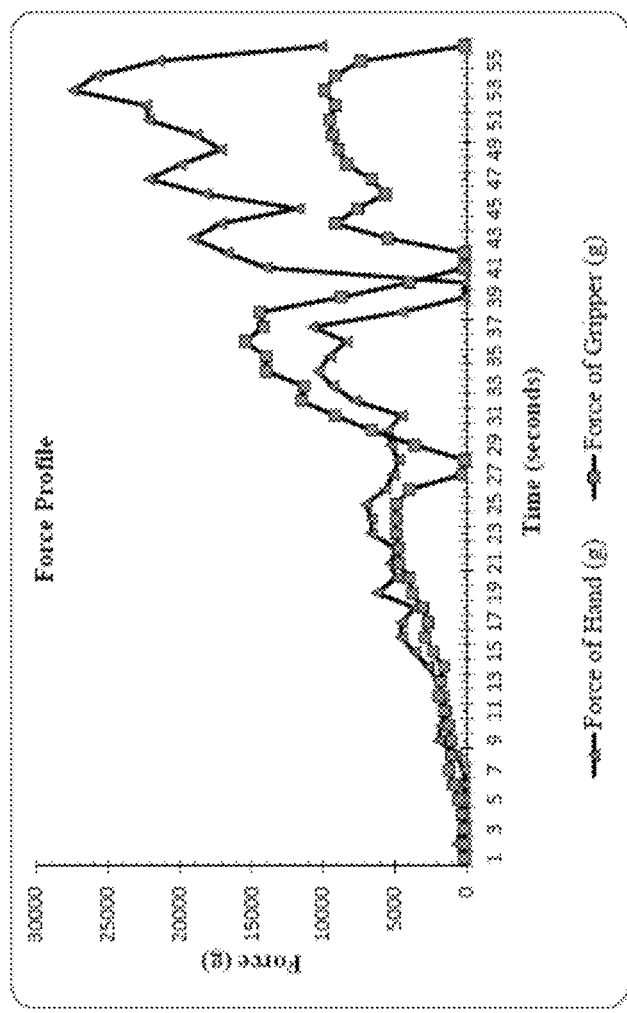

FIG. 12 shows flex position over time (reading every second), with the blue line for no manipulation (control), the red line for the profile of the gripper, and the green line for the profile of a hand. Without manipulation, the flex resistance does not change at all, which was expected. The gripper and hand both fluctuate over time, but they both cover the same range. This information was useful since it confirmed that the gripper can "flex" in the range of the human hand, showing that the flex sensor will work properly with the soft gripper. The pressure sensor was used to evaluate the force of the gripper and the hand over time (FIG. 13). The soft robot's force went up to 17,000 grams, and should be sufficient for gripping. An increase in gripping force can be achieved by increasing the air pressure. The maximum hand force reached 28,000 grams. Data was recorded every 0.5 second. Although the forces were different, the outcome shows that the gripper will work properly in the aspect of gripping force.

A number of experiments with video recordings of the gripper actuation and sensors data were conducted to characterize the function of the soft robotic gripper. The soft gripper function is summarized in the Table 2 below.

TABLE 2

Functional Evaluation of the Soft Gripper

| Function | Sensor Type | Parameters | Soft Gripper Range |
|---|---|---|---|
| Sensitivity | Temperature (TMP36) | Temperature variability (° C.) | Within 3° C. of actual |
|  |  | Response time (s) | 1 s |
| Bending | Flex (Flex Sensor 2.2) | Bend angle (degrees) | 150 degrees |
|  |  | Response time (s) | 1 s |
| Grip Ability | Pressure (Tekscan A301) | Grip Force (g) | 17,000 g |
|  |  | Response time (s) | 0.5 s |

Example 4. Soft Gripper Design Enhancements

Following the functional evaluation of the ECOFLEX® gripper, the next step was to investigate options to further improve the functionality of the gripper. Three variables were tested: 1) Material grade, 2) Design change, and 3) Actuation Pressure Value. For the gripper material evaluation, two grades of durometer materials were chosen: ECOFLEX® 00-30 (used previously) and ELASTOSIL® M 4601. ECOFLEX® 30 has a lower durometer and less dense than ELASTOSIL®, as shown in Table 3. It was observed that the ECOFLEX® actuator expanded considerably at a low applied pressure. In the case of our gripper, the ECOFLEX® was able to be inflated for less than 5 psi.

TABLE 3

Material Properties Comparison between Ecoflex ® and Elastosil ®

|  | Ecoflex 00-30 | Elastosil M 4601 |
|---|---|---|
| Density, g/cc | 1.07 | 1.13 |
| Mixing ratio (A:B) | 1:1 | 9:1 |
| Cure time, hours | 4 | 12 |
| Shore Hardness | 00-30 | A 28 |
| Tensile strength, N/mm$^2$ | 1.4 | 6.5 |
| Elongation, % | 900 | 700 |

Figure 14:
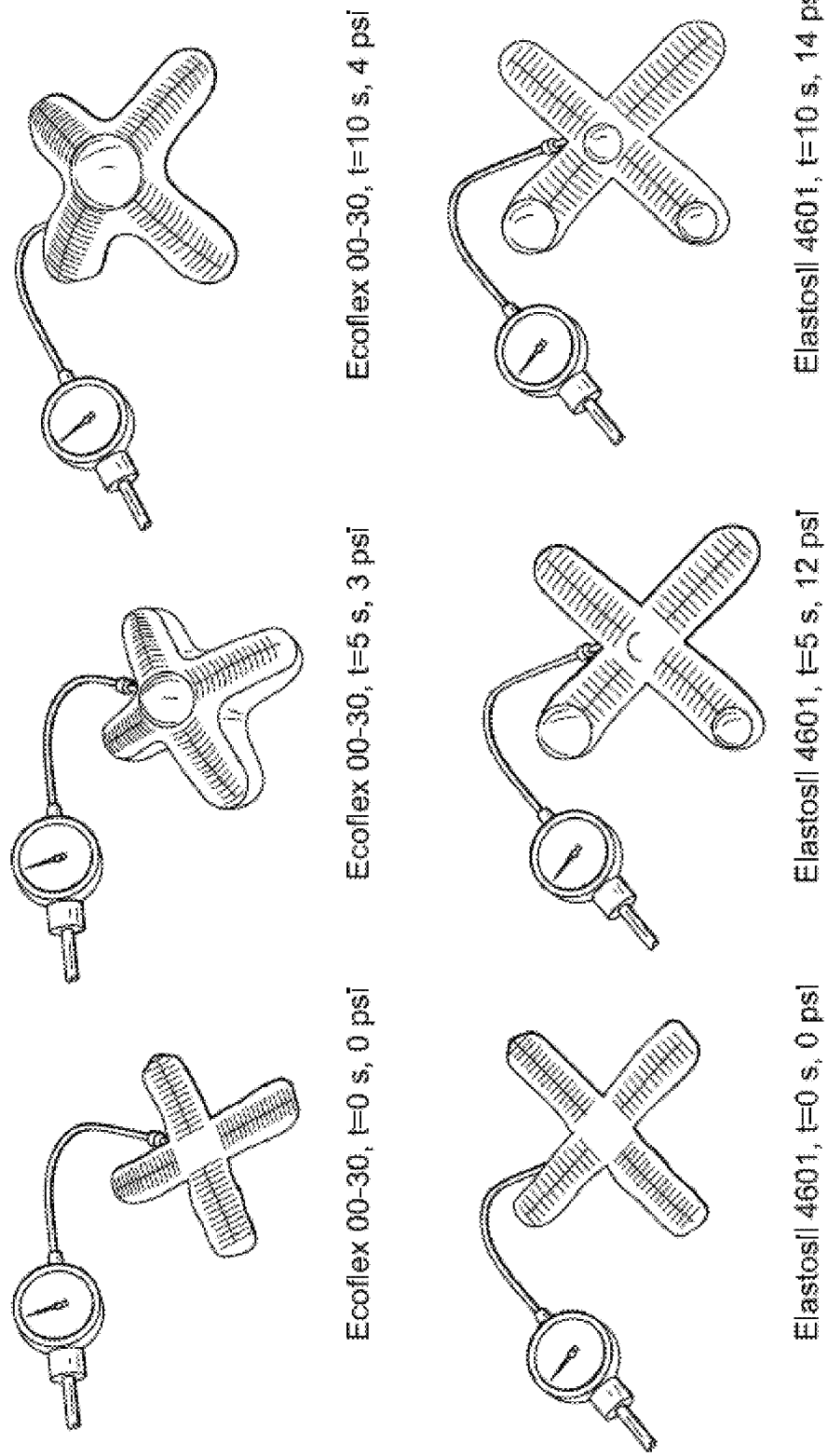
FIG. 14 is a series of photographs comparing the ECO-FLEX® and ELASTOSIL® gripper materials at various time points and pressures.

However with ELASTOSIL®, even over 15 psi the gripper could not be inflated (FIG. 14). Eventually the ELASTOSIL® gripper burst at 20 psi at the thinnest wall at the edges of the gripper. This shows higher pressure is required to actuate high durometer materials.

Figure 15:
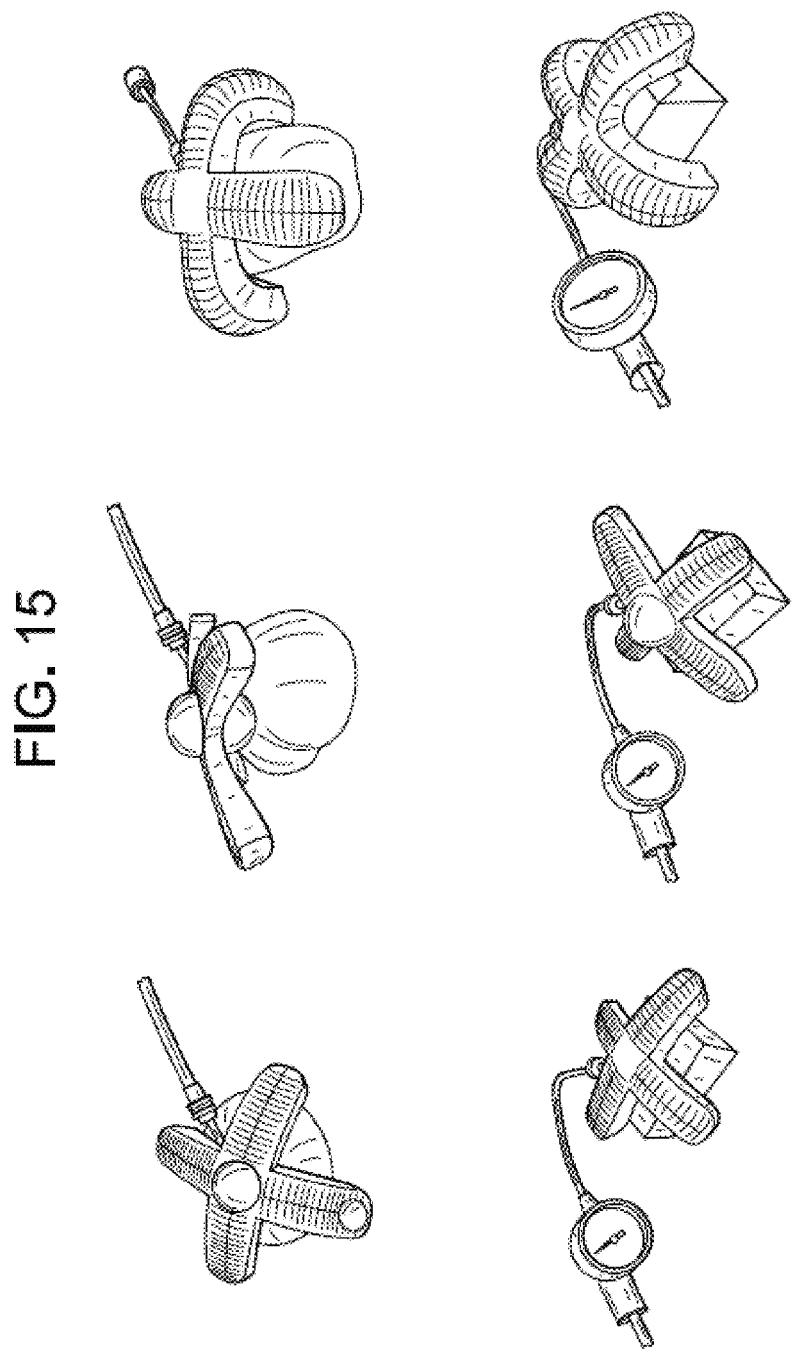
FIG. 15 is a series of photographs showing grip improvements by restraining the center of the gripper with a center restraint that comprises a portion of strain-limiting material with a higher elastic modulus than the remainder of the strain limiting material.

A number of experiments were conducted for inflating the actuator in use with various objects to study what design improvements can be made to further improve functionality. In the experiments, it was observed that the center area of the gripper expanded with air and consumed some air pressure in the center instead of the air traveling to the arm areas (FIG. 15).

By restraining in the center, the air could be used to pressurize the arms which then allowed gripper to grip better as shown in the below FIG. 9. Center restrain was created using rubber band for reinforcement. With this modification, the gripper achieved full bending and object could be picked up and carried over before being dropped into a box with under 4 psi air pressure (FIG. 16). From the results above, it can be seen that material, design, and pressure all play an important role in optimizing the actuation of the soft gripper.

Example 5. Finite Element Modeling

FEA (Finite Element Analysis) was used to better understand the effect of material, design and pressure on potential improvements in how the gripper behaves. Due to the soft nature of the soft Silicone material it is recommended to use a hyper elastic model for FE (Poisson's ratio of 0.48 and Young's Modulus of 106 N/m$^2$). In the Student edition Solidworks software the simulation was not able to execute for hyper elastic model. Therefore for comparison purposes, simplification to a linear elastic isotropic model was used for FEA using standard material Poisson's ratio of 0.39 and an Elastic (Young's) Modulus of 2e+009 N/m$^2$. Pressure on the gripper used in the simulation was 103,421 N/m$^2$ (15 psi). The pressure was applied to the inside of the air channels along all four arms of the gripper. The restraints to the inside faces were done to simulate center restraining of the gripper as shown in the FIG. 17.

TABLE 4

FEA Study Results for Stress, Strain and Displacement

| Restrain faces | Stress (N/m^2) | | Strain | | Displacement (mm) | |
|---|---|---|---|---|---|---|
|  | Min | Max | Min | Max | Min | Max |
| One | 1584.08 | 2.71853e+007 | 2.57909e−006 | 0.00935815 | 0 | 2.71788 |
| Two | 18067.5 | 2.07222e+007 | 2.76031e−006 | 0.00148203 | 0 | 0.307993 |
| Four | 4284.16 | 3.36868e+006 | 1.23825e−006 | 0.00119556 | 0 | 0.164892 |

The above values were used for relative comparison on stress, strain and displacement. The FEA analysis showed different motion results with one face, two face and four faces center restraints (FIG. 18A). While one face restraint showed most displacement, the two face restraining showed twisting motion and the four faces restraining showed bending motion. The design can be improved by stiffening the center area so maximum deflection is seen in the arms. The FEA simulation can also be used to change pressure values and material properties thus making it a good tool to evaluate how the gripper will behave with air actuation.

Example 6. Use of the Gripping Device to Track Disease Progression

Figure 19:
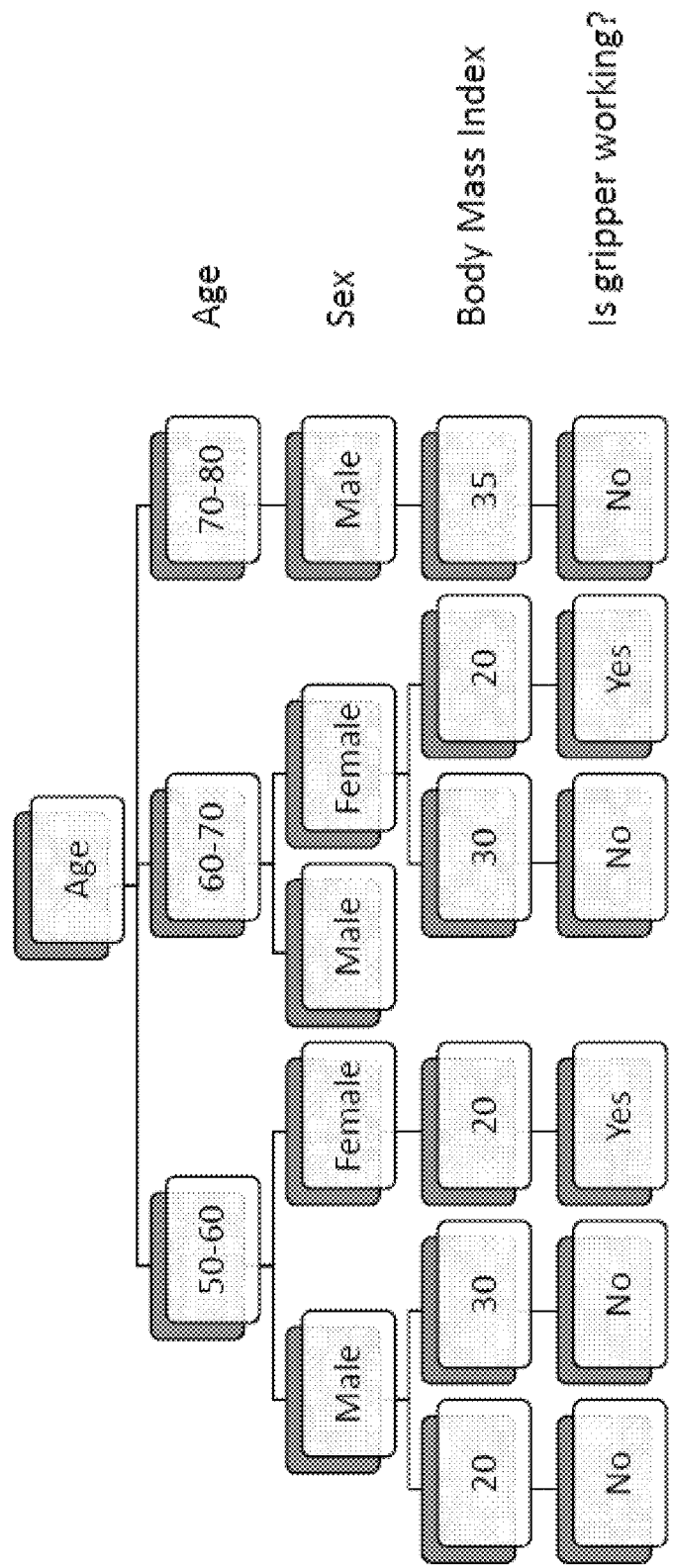
FIG. 19 is a flow chart tracking the results of gripper use in people of various ages and sexes.

The soft gripper can be also used for collecting information and learning about the disease as it progresses via artificial intelligence. The device measures whether the user can function properly with a certain configuration of function (Yes or No) of the device. As the condition improves (e.g., fewer features or less sensitivity is needed) or deteriorates (e.g., more features or increased sensitivity is needed), the device can track these changes as a monitor for the disease progression, as shown in Table 5 below and in FIG. 19.

TABLE 5

Tracking user data for effectiveness of gripper.

| Patient | Gender | Age | BMI | Effect of gripper working |
|---|---|---|---|---|
| 1 | F | 50-60 | 20 | Yes |
| 2 | F | 60-70 | 30 | No |
| 3 | M | 50-60 | 30 | No |
| 4 | M | 70-80 | 35 | No |
| 5 | M | 50-60 | 20 | No |
| 6 | F | 60-70 | 20 | Yes |

Example 7. Use of the Gripping Device as a Training or Rehabilitation Device

Small exercises are commonly used to help treat diabetic neuropathy. One of these exercises includes placing the palms of one's hands on a flat surface, and then raising and lowering each finger in succession. This exercise extends each finger for a short amount of time, making those muscles stronger and able to combat neuropathy. For patients with severe cases of neuropathy, the gripper can help them perform exercises like this one. The gripper will do most of the work in moving the patient's fingers, but they will still experience the same exercise. In this specific case, the gripper will move each of its fingers up and down, which in turn will also move the patient's fingers that are attached to the gripper. As the patient improves its gripping ability, the patient can switch to a second gripper which provides less assistive force in the exercise or the same gripper can be functionally altered to adjust the assistive force.

Example 8. Decision Tree Algorithm to Activate Grip Function

A gripping device is designed to be connected to a peripheral device showing temperature, flexure, and pressure parameters measured by the sensors (FIG. 20). The gripping device also has on/off switch, a low threshold alarm, and a high threshold alarm. The low threshold and high threshold alarms are triggered when one or more of the flex angle, temperature, and grip force exceeds above or below a predetermined threshold (e.g., temperature greater than 20° C., 30° C., 40° C., 50° C., 60° C., 70° C., 80° C., 90° C., or 100° C.; temperature less than 20° C., 10° C., 0° C., −10° C., −20° C., −30° C., −40° C., −50° C., or −60° C.; pressure greater than 5 psi, 10 psi, 20 psi, 30 psi, 40 psi, 50 psi, 60 psi, 70 psi, 80 psi, 90 psi, or 100 psi; flex angle beyond 120°, 130°, 140°, 150°, 160°, 170°, or 180°). Additionally, the gripper can be designed to activate its grip function when within a predetermined or desirable range of flex angle, temperature, and/or grip force (FIGS. 21A-21B). Therefore, the gripper can be configured to activate under pre-set or user defined parameters.

Other Embodiments

All publications, patents, and patent applications mentioned in the above specification are hereby incorporated by reference to the same extent as if each individual publication, patent or patent application was specifically and individually indicated to be incorporated by reference in its entirety.

While the invention has been described in connection with specific embodiments thereof, it will be understood that it is capable of further modifications and this application is intended to cover any variations, uses, or adaptations of the invention following, in general, the principles of the invention and including such departures from the invention that come within known or customary practice within the art to which the invention pertains and may be applied to the essential features hereinbefore set forth, and follows in the scope of the claims.

Other embodiments are within the claims.

The invention claimed is:

1. A soft robotic assistive gripping device, comprising:
   a) a flexible molded body comprising a plurality of actuatable arms ending in a tip, wherein the flexible molded body comprises:
   i) a main channel disposed within the molded body, wherein a plurality of interconnected channels branch out from the main channel, the plurality of interconnected channels comprise a first row of channels on a first side of the main channel and a second row of channels on a second side of the main channel, wherein the second side is opposite to the first side of the main channel, wherein the molded body comprises an elastically extensible material and a strain-limiting material having a higher elastic modulus relative to the elastically extensible material; and
   ii) a pressurizing inlet connected to a fluid source, wherein the pressuring inlet is configured to receive fluid from the fluid source into the plurality of interconnected channels, wherein the molded body is configured to expand when the plurality of interconnected channels are pressurized by the fluid, thereby causing a bending motion around the strain-limiting material of the molded body;
   b) at least one sensor affixed or integrated into at least one of the plurality of actuatable arms; and
   c) a skin covering each said tip, wherein a region between the skin and each said tip comprises a plurality of interconnected microchannels configured to receive fluid from a second pressurizing inlet wherein each channel of the plurality of interconnected microchannels has a width of from 100 μM to about 500 μM.

2. The gripping device of claim 1, wherein the at least one sensor is configured to detect temperature, pressure, flexure, or motion.

3. The gripping device of claim 1, further comprising a microprocessor, wherein the microprocessor is programmed with artificial intelligence software and/or is connected to the sensor.

4. The gripping device of claim 1, further comprising a peripheral device, wherein the peripheral device is a cellular phone or tablet and/or comprises an LED display that displays information collected by the at least one sensor.

5. The gripping device of claim 1, wherein:
   a) a modular component is affixed to at least one of the plurality of actuatable arms.

6. The gripping device of claim 1, wherein:
   (a) the gripping device is integrated into a glove or configured to be affixed to a hand,
   (b) the gripping device is configured to be affixed to the hand with at least one strap; and/or (c) the device is configured to be positioned between the hand and an object.

7. The gripping device of claim 1, wherein the gripping device is configured to replace a function of a hand, wherein the function is touch or grip.

8. A method of assisting a subject to grip an object comprising providing the gripping device of claim 1 and initiating a series of pressurizations and depressurizations that bring the gripping device in gripping contact with a target object.

9. The method of claim 8, wherein the gripping device is used as an assistive device for the subject, wherein the subject suffers from a peripheral dysfunction.

10. The method of claim 9, wherein the peripheral dysfunction is a peripheral neuropathy.

11. The method of claim 10, wherein the peripheral neuropathy is a diabetic neuropathy.

12. The method of claim 8, wherein the method comprises affixing the gripping device to a hand of the subject, whereby the gripping device assists the subject with a daily activity of life.

13. The method of claim 8, wherein the subject inputs a defined range of a parameter sensed by the at least one sensor, and wherein the gripping device alerts the subject when the at least one sensor detects that the parameter is outside the defined range.

14. The method of claim 13, wherein the parameter is selected from temperature, pressure, and flexure.

15. The method of claim 8, wherein the method comprises affixing the gripping device to a hand of the subject, whereby the gripping device assists the subject with a rehabilitation exercise by providing an assistive gripping force.

16. The method of claim 15, wherein the subject uses the gripping device for a first rehabilitation exercise and a second gripping device for a second rehabilitation exercise, wherein the gripping device provides increased or decreased assistive gripping force as compared to the second gripping device.

17. The method of claim 8, wherein the gripping device is modularly altered to provide an increased or decreased assistive gripping force.

18. The method of claim 17, wherein the gripping device comprises a center restraint module.

19. The method of claim 8, wherein the method comprises affixing the gripping device to a hand of the subject, whereby the gripping device is used to monitor progression of a disease by tracking an increase or decrease of the subject's gripping ability over time.

20. The method of claim 19, wherein the disease is diabetes and/or wherein the subject is a human.

21. A method of monitoring progress of a peripheral neuropathy in a subject comprising affixing the gripping device of claim 1 to a hand of the subject and assessing indicia of the subject selected from one or more of gripping strength, temperature sensitivity, pressure sensitivity, and flexure sensitivity, wherein changes in the indicia indicate the progress of the peripheral neuropathy.

22. The device of claim 1, wherein each region between the skin and each said tip is configured to be independently actuatable.

23. The gripping device of claim 1, wherein the plurality of actuatable arms comprise four actuatable arms.

24. The gripping device of claim 1, wherein the device is configured to be affixed to a subject's palm.

* * * * *

UNITED STATES PATENT AND TRADEMARK OFFICE
CERTIFICATE OF CORRECTION

PATENT NO. : 11,027,436 B2
APPLICATION NO. : 15/958744
DATED : June 8, 2021
INVENTOR(S) : Alekh Rajesh Beri It is certified that error appears in the above-identified patent and that said Letters Patent is hereby corrected as shown below:

On the Title Page

Line 6 of Abstract, replace "actuated by aft" with --actuated by air--.

In the Specification

Column 1, Line 48, replace "compressed aft" with --compressed air--;
 Line 57, replace "aft powered" with --air powered--.

Column 2, Line 5, replace "aft tubes providing structure for aft flow" with --air tubes providing structure for air flow--;
 Line 10, replace "the aft" with --the air--;
 Line 11, replace "aft source" with --air source--;
 Line 18, replace "by aft" with --by air--;
 Line 30, replace "little aft" with --little air--.

Column 8, Line 54, replace "aft tubes structured for aft flow" with --air tubes structured for air flow--;
 Line 59, replace "aft channels" with --air channels--;
 Line 66, replace "pressurized by aft" with --pressurized by air--.

Column 9, Line 2, replace "aft channels" with --air channels--.

Column 15, Line 22, replace "consisted of bunt in" with --consisted of built in--.

Signed and Sealed this
Fifth Day of October, 2021

Drew Hirshfeld
*Performing the Functions and Duties of the
Under Secretary of Commerce for Intellectual Property and
Director of the United States Patent and Trademark Office*